(12) United States Patent
Furuichi et al.

(10) Patent No.: US 10,062,277 B2
(45) Date of Patent: *Aug. 28, 2018

(54) INFORMATION SHARING AMONG MOBILE APPARATUS

(71) Applicant: International Business Machines Corporation, Armonk, NY (US)

(72) Inventors: Sanehiro Furuichi, Tokyo (JP); Norie Iwasaki, Fujisawa (JP); Masami Tada, Sagamihara (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,560

(22) Filed: Jan. 24, 2017

(65) Prior Publication Data

US 2018/0211522 A1  Jul. 26, 2018

(51) Int. Cl.

| G08G 1/09 | (2006.01) |
| G08G 1/01 | (2006.01) |
| G01C 21/20 | (2006.01) |
| G08G 1/16 | (2006.01) |
| G01C 21/34 | (2006.01) |
| G01C 21/36 | (2006.01) |

(52) U.S. Cl.
CPC .......... *G08G 1/0141* (2013.01); *G01C 21/20* (2013.01); *G01C 21/3415* (2013.01); *G01C 21/3691* (2013.01); *G08G 1/0112* (2013.01); *G08G 1/0133* (2013.01); *G08G 1/162* (2013.01)

(58) Field of Classification Search
CPC .... G08G 1/0112; G08G 1/012; G08G 1/0141; G08G 1/0133; G08G 1/0965; G08G 1/162; G08G 1/0967–1/096791; G01C 21/3691; G01C 21/3415; G01C 21/3694; G01C 21/20

USPC ......... 340/905, 903, 435; 701/117–119, 300, 701/301

See application file for complete search history.

(56) References Cited

U.S. PATENT DOCUMENTS

| 7,440,842 B1* | 10/2008 | Vorona ............. G08G 1/096791 340/995.12 |
| 8,694,241 B1* | 4/2014 | Kadous ................ G08G 1/0112 701/118 |
| 9,031,779 B2 | 5/2015 | Djugash et al. |

(Continued)

OTHER PUBLICATIONS

Liu et al., "Internet of Things' Authentication and Access Control", International Journal of Security and Networks, vol. 7, Iss. 4, © 2012, 14 pages.

(Continued)

*Primary Examiner* — Thomas Mullen
(74) *Attorney, Agent, or Firm* — Yee & Associates, P.C.; Jeffrey S. LaBaw

(57) ABSTRACT

Verifying shared event information is provided. Communication with a nearby mobile or immobile apparatus is established to generate an event existence proof in response to encountering the nearby mobile or immobile apparatus. Existence of an incident event is verified in response to arriving at a geographic location of the incident event. A verified incident event is published to add to an incident event distributed ledger for managing incident event information corresponding to the incident event.

10 Claims, 15 Drawing Sheets

(56) References Cited

U.S. PATENT DOCUMENTS

| | | | |
|---|---|---|---|
| 9,454,903 B2* | 9/2016 | Sobue | G08G 1/0112 |
| 2003/0187571 A1* | 10/2003 | Impson | G08G 1/0104 |
| | | | 701/117 |
| 2008/0319824 A1 | 12/2008 | Linthicum et al. | |
| 2013/0154854 A1* | 6/2013 | Chen | G08G 1/096741 |
| | | | 340/905 |
| 2015/0039361 A1* | 2/2015 | Crowther | G06Q 10/0631 |
| | | | 705/7.12 |
| 2015/0254986 A1 | 9/2015 | Fairfield et al. | |
| 2016/0117471 A1 | 4/2016 | Belt et al. | |
| 2017/0292845 A1* | 10/2017 | Yamasaki | G01C 21/3415 |

OTHER PUBLICATIONS

Xu et al., "The Blockchain as a Software Connector", 2016 13th Working IEEE/IFIP Conference on Software Architecture (WISCA), Apr. 2016, 10 pages.

\* cited by examiner

INFORMATION SHARING AMONG MOBILE APPARATUS

BACKGROUND

1. Field

The present invention, generally, relates to information sharing techniques, more particularly, to sharing event information among a plurality of mobile apparatus, each mobile apparatus including set of sensors and a data processing system to detect and process the event information.

2. Description of the Related Art

In response to recent advances in Internet of Things (IoT)-related technologies, there have been developed platforms, in which road hazard information, weather information, environmental information, and the like are collected from operating mobile apparatus, such as running vehicles, and utilized for map information updates and dynamic route navigations by delivering the collected information to computing nodes via a network. In typical configurations, the collected information may be managed by a specific service provider in a centralized manner.

SUMMARY

According to one illustrative embodiment, a mobile apparatus for verifying shared event information is provided. The mobile apparatus communicates with a nearby mobile or immobile apparatus to generate an event existence proof in response to encountering the nearby mobile or immobile apparatus. The mobile apparatus verifies existence of an incident event in response to arriving at a geographic location of the incident event. The mobile apparatus publishes a verified incident event to add to an incident event distributed ledger for managing incident event information corresponding to the incident event. According to another illustrative embodiment, a computer program product for verifying shared event information is provided.

DETAILED DESCRIPTION

Figure 1:
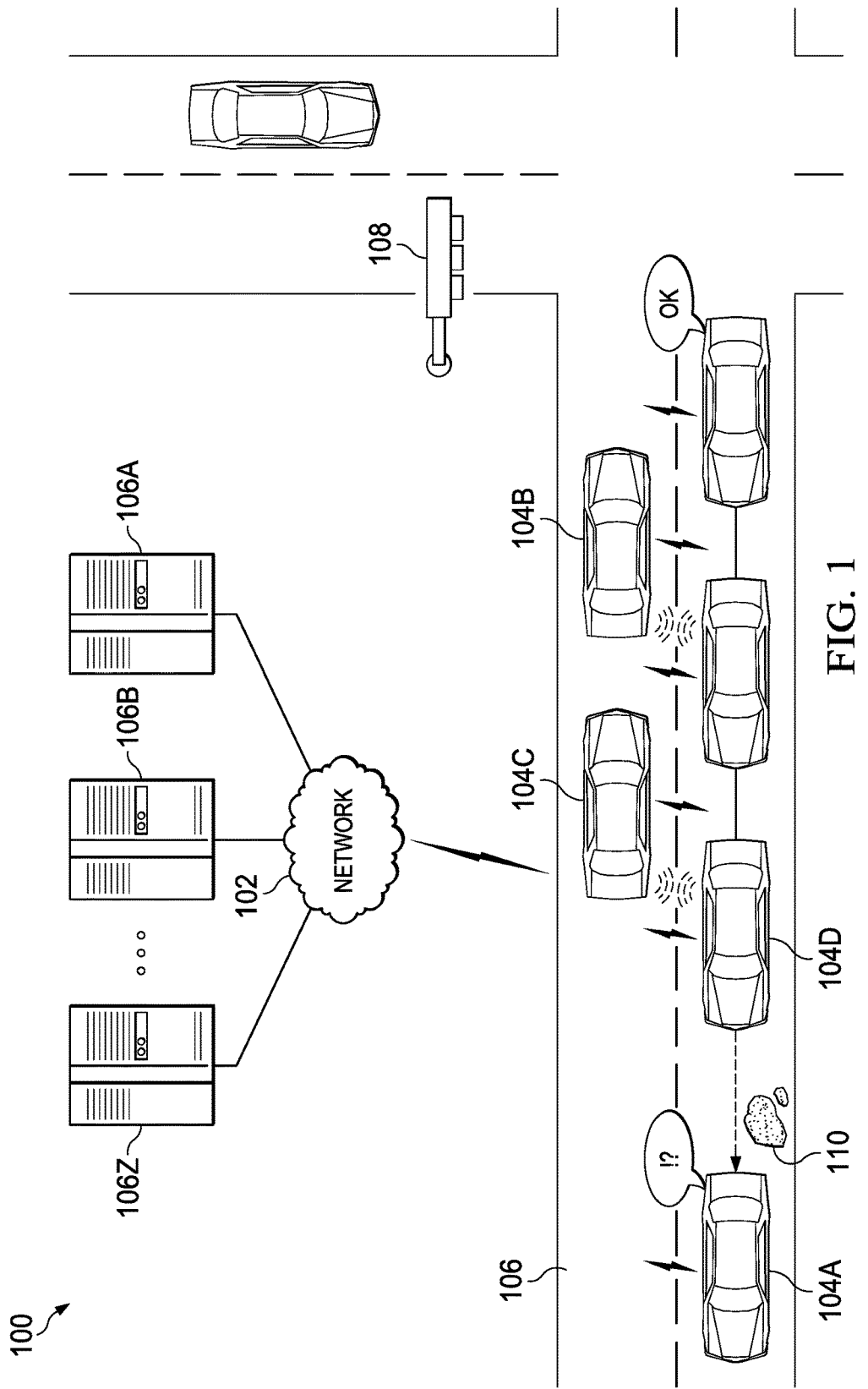
FIG. 1 is a diagram illustrating an example of an event information sharing environment in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the course of developing illustrative embodiments, it was discovered that a way of validating reliability of reported event information to a service provider does not currently exist. Also, it is difficult for service providers to respond immediately to state changes of incident events, such as, for example, elimination of an obstruction or escalation of a road hazard. In addition, operational cost for a centralized management of event information by service providers may be considerably high. Furthermore, a risk of event information manipulation may exist. Illustrative embodiments provide computer-implemented methods, computer systems, and computer program products for sharing event information among a plurality of mobile apparatus, including event information detection, event information verification, event information validation, event information publication, and event existence proof verification and validation functionalities.

With reference now to the figures, and in particular, with reference to FIGS. 1-4, 6-9, and 13-15, diagrams of data processing environments are provided in which illustrative embodiments may be implemented. It should be appreciated that 1-4, 6-9, and 13-15 are only meant as examples and are not intended to assert or imply any limitation with regard to the environments in which different embodiments may be implemented. Many modifications to the depicted environments may be made.

FIG. 1 depicts a diagram illustrating an example of an event information sharing environment in accordance with an illustrative embodiment environment. In this example, event information sharing environment 100 includes network 102, which is the medium used to provide communications links between mobile apparatus, computers, data processing systems, and other devices connected together within event information sharing environment 100. Network 102 may include connections, such as, for example, wire communication links or wireless communication links. Event information sharing environment 100 also includes a plurality of mobile apparatus, such as vehicle 104A, vehicle 104B, vehicle 104C, and vehicle 104D, which connect to network 102 via wireless communication links, and a plurality of computing nodes, such as computing node 106A, computing node 106B, . . . and computing node 106Z, which also connect to network 102 via wired and/or wireless communication links. It should be noted that the plurality of mobile apparatus may include a set of one or more sensors and a set of one or more data processing devices to detect and process event information.

Vehicle 104A, vehicle 104B, vehicle 104C, and vehicle 104D may run on roadway 106, along its own route to a respective travel destination. Roadway 106 may be, for example, a paved roadway, such as a street, a state highway, an interstate highway, and the like or an unpaved roadway, such as a gravel or dirt road, a trail, or open area. Vehicle 104A, vehicle 104B, vehicle 104C, and vehicle 104D may be equipped with a mobile communications unit for connecting to the network 102 via a mobile wireless communications system. Vehicle 104A, vehicle 104B, vehicle 104C, and vehicle 104D also may be equipped with a short-range wireless communication unit for communicating with a nearby mobile or immobile apparatus. Nearby mobile apparatus may include, for example, oncoming vehicles heading in an opposite direction, following vehicles heading in a same direction, overtaking vehicles passing in the same direction, and the like. An immobile apparatus may include, for example, a traffic signaling apparatus, such as traffic signal device 108, and the like.

In this example, vehicle 104A, using a set of on-board sensors, detects obstruction 110 on roadway 106 as an incident event. Such incident event information may be useful to a nearby vehicle, such as vehicle 104D, traveling on roadway 106 along its own route, which is a similar route to that of vehicle 104A. In this example, nearby vehicle 104D may be interested in the incident event detected by leading vehicle 104A and may want to know about the incident event. On the other hand, a vehicle, such as vehicle 104B or vehicle 104C, which is traveling along a different route from that of vehicle 104A may not be interested in the incident event detected by vehicle 104A.

Illustrative embodiments may share this geographically-dependent incident event information among the plurality of mobile apparatus on roadway 106, such as vehicle 104A, vehicle 104B, vehicle 104C, and vehicle 104D, via network 102 in a decentralized manner by using event information sharing environment 100. Illustrative embodiments may achieve the sharing of the incident event information using, for example, a distributed ledger dedicated for incident event information sharing.

Furthermore, in this example vehicle 104D verifies the incident event information detected by leading vehicle 104A while traveling along roadway 106 on its own route that passes nearby the geographic location or place of the incident event (i.e., obstruction 110). Vehicle 104D may communicate with oncoming vehicle 104B, oncoming vehicle 104C, and immobile traffic signal device 108 en route to the geographic location of the incident event and request that each oncoming vehicle 104B and 104C testify to an encounter between vehicle 104D and respective oncoming vehicles 104B and 104C. Illustrative embodiments may manage event existence proofs for testifying to mobile apparatus encounters by using, for example, a distributed ledger dedicated for event existence proof management.

Illustrative embodiments may employ block chains as the distributed ledgers, which illustrative embodiments may utilize for incident event information sharing and event existence proof management. However, it should be noted that illustrative embodiments also may utilize any other distributed ledger having a data structure other than a block chain structure as both or either of the distributed ledgers mentioned above.

In the example shown in FIG. 1, the mobile apparatus participating in the incident event information sharing may be a ground vehicle, such as, for example, an automobile, a truck, a van, a sport utility vehicle, a bus, a semi-tractor trailer, a train, an off-road vehicle, a motorcycle, and the like. However, it should be noted that illustrative embodiments are not limited to only ground vehicles as illustrated in the example of FIG. 1. For example, illustrative embodiments may utilize other types of vehicles, such as aircraft, which may include manned aerial vehicles and unmanned aerial vehicles (e.g., drones), watercrafts, such as ships and boats, and human-powered vehicles, such as bicycles. Further, illustrative embodiments may utilize on-board computing devices included with the above-mentioned vehicles, as well as portable apparatus, such as smart phones, personal digital assistants, portable gaming devices, mobile computers, and the like.

Computing nodes 106A-106Z may include any known general purpose computer, such as a network computer, a desktop or personal computer, a workstation computer, a computer cluster, a mainframe, and the like. In addition, computing nodes 106A-106Z also may include special purpose computers having specialized hardware, such as a Field Programmable Gate Array (FPGA) and/or an Application Specific Integrated Circuit (ASIC). Computing nodes 106A-106Z may participate in the processing of the block chains, which may include validation of the incident event information and validation and verification of the event existence proof.

Network 102 may include any kind of wired and/or wireless network infrastructures including an internet, an intranet, a local area network (LAN), a wide area network (WAN), and the like. Further, illustrative embodiments may establish peer-to-peer networks (P2P networks) for different block chains within network 102.

It should be noted that obstruction 110 is only one example of a possible incident event detected by vehicle 104A. In other words, illustrative embodiments are not limited to only obstruction 110. Detectable incident events may include, for example, an automobile accident, a disabled vehicle, a construction work zone, hazardous driving conditions, such as roadway flooding or icing, restrictions, roadway closures, speed limitations, snow chain requirements, one-way alternating traffic patterns, and the like. Furthermore, detectable incident events also may include traffic condition information, such as traffic congestion or smooth moving traffic, business information, such as business closings or parking status, and the like.

Figure 2:
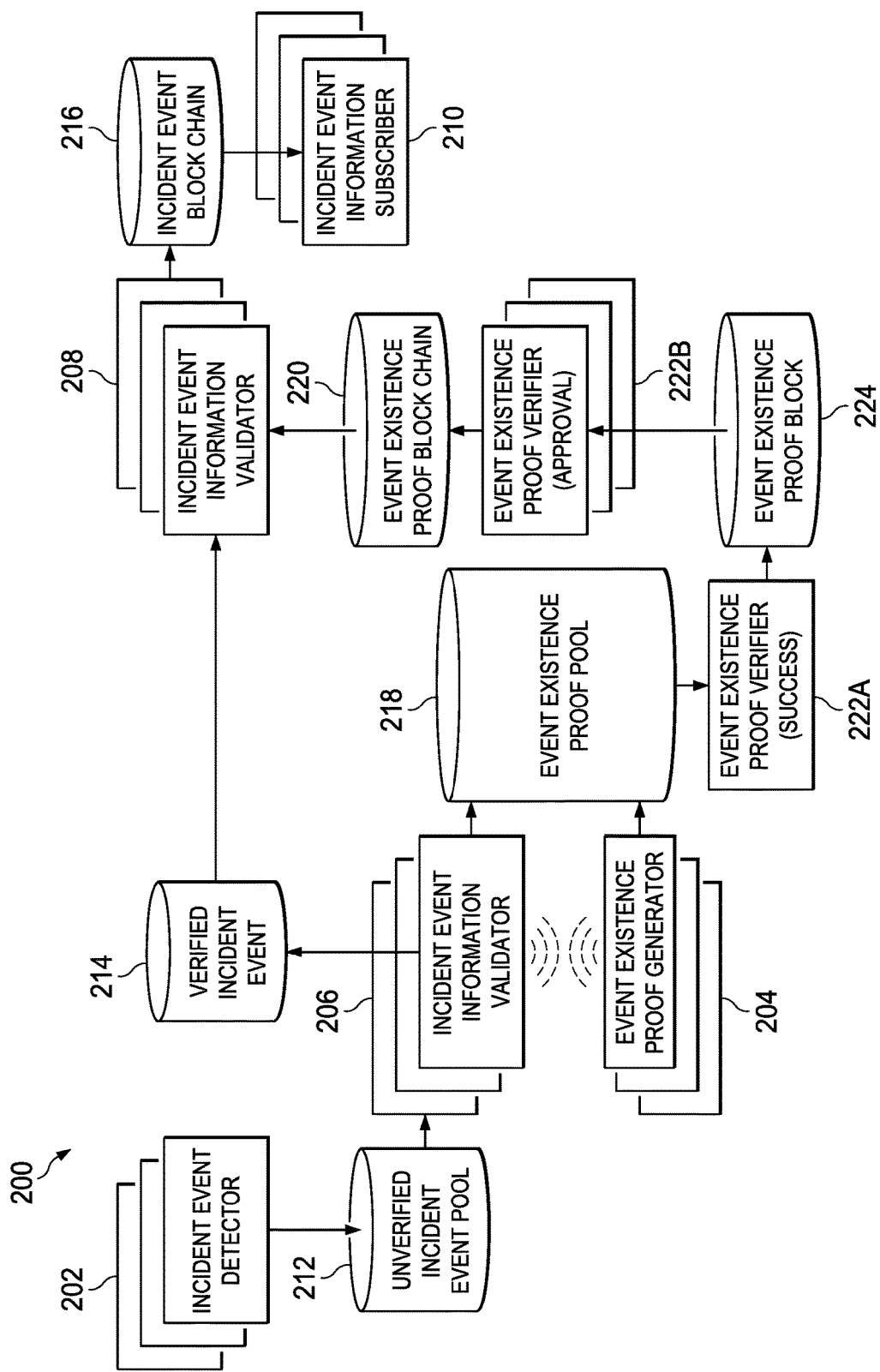
FIG. 2 is a block diagram illustrating an example of an event information sharing system in accordance with an illustrative embodiment.

With reference now to FIG. 2, a block diagram illustrating an example of an event information sharing system is depicted in accordance with an illustrative embodiment. Event information sharing system 200 may include a set of one or more incident event detectors 202; a set of one or more event existence proof generators 204; a set of one or more incident event information verifiers 206; a set of one or more incident event information validators 208; and a set of one or more incident event information subscribers 210.

Incident event detector 202 may be one of the mobile apparatus, such as vehicles 104A-104D, shown in FIG. 1.

Incident event detector 202 may detect an incident event, such as obstruction 110 in FIG. 1, which occurred in a geographic location within a predefined distance (e.g., a distance set by an event sensor limit) from incident event detector 202. Incident event detector 202 also may report the detected incident event to other mobile apparatus nearby (e.g., mobile apparatus within communication range of incident event detector 202 via a P2P network). Incident event detector 202 may issue an incident event transaction regarding the detected incident event via the P2P network to notify nearby mobile apparatus of the occurrence of the incident event.

Each incident event transaction may include information regarding the detected incident event, such as, for example, a geographic location of the incident event, a time of detection of the incident event, a digital signature of incident event detector 202, and the like. Illustrative embodiments may store an incident event transaction in unverified incident event pool 212 for a period of time as an unverified incident event corresponding to a specific geographic location. It should be noted that multiple information detectors may issue multiple incident event transactions corresponding to a same or an identical incident event.

Incident event information verifier 206 also may be one of vehicles 104A-104D in FIG. 1. Incident event information verifier 206 may verify existence of the unverified incident event at the geographic location reported by incident event detector 202. Incident event information verifier 206 may communicate with a nearby event existence proof generator 204 to generate an event existence proof in response to encountering nearby event existence proof generator 204 that is traveling to the geographic location of the unverified incident event. In one illustrative embodiment, incident event information verifier 206 may initiate communications for the event existence proof in response to receiving the incident event transaction of the unverified incident event. However, it should be noted that in other illustrative embodiments, incident event information verifier 206 may perform communications for every encountered incident event while operating.

In response to arriving at the geographic location of the unverified incident event, incident event information verifier 206 may determine whether the unverified incident event, which was detected and reported by incident event detector 202, is equal to or identical with what is currently occurring at the geographic location of the unverified incident event upon arrival. Incident event information verifier 206 may generate verified incident event 214 and store verified incident event 214 in a verified incident event pool. In addition, incident event information verifier 206 may publish verified incident event 214 via a network, such as network 102 in FIG. 1.

Verified incident event 214 may include, for example, a set of one or more incident event transactions corresponding to the incident event; a list of event existence proofs generated during a period of time starting from when incident event information verifier 206 was notified about the incident event and ending when incident event information verifier 206 arrives at the geographic location of the incident event; and a digital signature corresponding to incident event information verifier 206. Incident event information validator 208 may add verified incident event 214 to an incident event block chain, such as incident event block chain 216. Illustrative embodiments may utilize incident event block chain 216 to manage information corresponding to the incident event after validation based on the generated event existence proofs, which are in terms of geographic locations of incident event information verifier 206.

Event existence proof generator 204 may be, for example, a mobile apparatus or an immobile apparatus, such as one of vehicles 104A-104D or traffic signal device 108 in FIG. 1. Event existence proof generator 204 may communicate with nearby incident event information verifier 206 to generate an event existence proof in response to encountering nearby incident event information verifier 206. Thus, event existence proof generator 204 may testify to incident event information verifier 206 being at a specific geographic location, at a specific time.

The encounter with nearby incident event information verifier 206 may take a variety of forms. For example, if event existence proof generator 204 is a mobile apparatus, then event existence proof generator 204 may be a passing oncoming incident event information verifier that is traveling in an opposite direction, an overtaking preceding incident event information verifier that is traveling in the same direction, or an overtaken succeeding incident event information verifier that is traveling in the same direction. If event existence proof generator 204 is an immovable apparatus, such as a traffic signaling apparatus, then event existence proof generator 204 may be passed by an incident event information verifier that is traveling toward the incident event.

In this example, incident event information verifier 206 may issue an event existence proof transaction via the network when encountering event existence proof generator 204. At the same time, event existence proof generator 204 also may issue an event existence proof transaction via the network when encountering incident event information verifier 206. The event existence proof transaction may include, for example, identifiers of both parties of the encounter, a geographic location of the encounter, and a time of the encounter. Illustrative embodiments may store the event existence proof transaction in event existence proof pool 218 for a predetermined period of time. Illustrative embodiments add the event existence proof transaction to event existence proof block chain 220 after verification and validation in terms of geographic location consistency with other event existence proof transactions.

In this example, both incident event information verifier 206 and event existence proof generator 204, which encountered each other, may issue respective event existence proof transactions via the network. However, it should be noted that in an alternative illustrative embodiment, either incident event information verifier 206 or event existence proof generator 204 may issue an event existence proof transaction after obtaining a digital signature of the other encountered party via their network communications. For example, incident event information verifier 206 may issue an event existence proof transaction digitally signed by a corresponding event existence proof generator 204.

Incident event information validator 208 may be, for example, a computing node, such as one of computing nodes 106A-106Z in FIG. 1. Incident event information validator 208 may validate verified incident event 214, which is published by incident event information verifier 206 that has been to the geographic location of the incident event in terms of geographic locations of incident event information verifier 206 by using event existence proofs in event existence proof block chain 220. After validating verified incident event 214, incident event information validator 208 may add a verified event block including verified incident event 214 to incident event block chain 216.

Incident event block chain 216 may be, for example, a distributed ledger dedicated to managing event information corresponding to specific incident events. One or more participants of an event information sharing environment, such as event information sharing environment 100 in FIG. 1, may access incident event block chain 216. Incident event block chain 216 may include, for example, a set of one or more verified incident event blocks, each of which may include a verified incident event corresponding to the incident event. Illustrative embodiments may identify verified incident events, which are associated with same or similar geographic locations, as relevant incident events and may record these verified incident events in a same incident event block chain 216. Illustrative embodiments may generate incident event block chain 216 in response to first recognition of a relevant incident event and may delete incident event block chain 216 in response to removal of the incident event. Illustrative embodiments may extend incident event block chain 216 in response to subsequent verified incident events that illustrative embodiments determine to be relevant. After obtaining consensus about a new verified event block among a plurality of incident event information validators 208, illustrative embodiments settle incident event block chain 216.

Incident event information subscriber 210 also may be a mobile apparatus, such as one of the vehicles 104A-104D in FIG. 1. Incident event information subscriber 210 may receive a subscription of event information corresponding to the incident event from one or more validated incident events when incident event information subscriber 210 is interested in the incident event. Incident event information subscriber 210 may be interested in the event information because the incident event corresponds to a nearby geographic location of a current geographic position of incident event information subscriber 210 or a scheduled or estimated route of incident event information subscriber 210, for example. To subscribe to the event information, incident event information subscriber 210 may refer to incident event block chain 216, which corresponds to the incident event of interest.

The event information sharing system may further include a set of one or more event existence proof verifiers, such as event existence proof verifiers 222A and 222B. Illustrative embodiments may manage the event existence proof transaction, which is issued by incident event information verifier 206 and/or event existence proof generator 204, by using event existence proof block chain 220. As described above, illustrative embodiments may store the event existence proof transaction in event existence proof pool 218 as an unverified event existence proof.

Event existence proof verifiers 222A and 222B also may be computing nodes. Event existence proof verifier 222A may verify the event existence proof transaction issued by one participant in terms of geographic location consistency with other existence proof transactions, which may be issued by other participants. Then, event existence proof verifier 222A may generate event existence proof block 224 that constitutes event existence proof block chain 220. Each block in the chain may include one or more verified event existence proof transactions.

Verification of the event existence proof transaction may be a type of competition. Event existence proof verifier 222A, which succeeds in the verification under a given challenge level, may generate event existence proof block 224. Event existence proof verifiers 222B may validate event existence proof block 224, which was generated by event existence proof verifier 222A, and may add event existence proof block 224 to event existence proof block chain 220 after approval. After obtaining consensus regarding new event existence proof block 224 among a plurality of event existence proof verifiers, illustrative embodiments settle event existence proof block chain 220.

It should be noted that the different illustrative embodiments may not limit the number of incident event detectors 202, the number of event existence proof generators 204, the number of incident event information verifiers 206, the number of incident event information validators 208, and the number of incident event information subscribers 210 in the event information sharing environment. In addition, the different illustrative embodiments may not limit the types of incident events capable of being detected by the different illustrative embodiments or the number of incident events that the different illustrative embodiments may handle.

Figure 3:
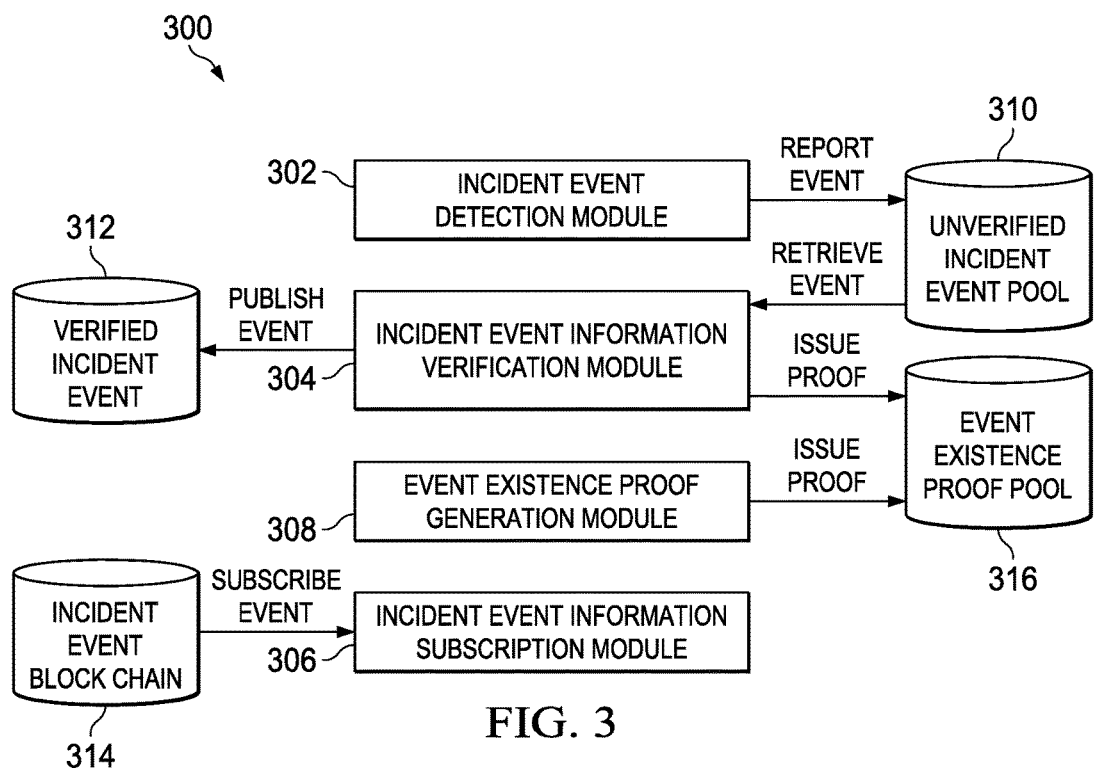
FIG. 3 is a diagram illustrating a set of example components implemented on a mobile apparatus in accordance with an illustrative embodiment.

With reference now to FIG. 3, a diagram illustrating a set of example components implemented on a mobile apparatus is depicted in accordance with an illustrative embodiment. Mobile apparatus 300 may include, for example, incident event detection module 302, incident event information verification module 304, incident event information subscription module 306, and event existence proof generation module 308. Mobile apparatus 300 also may include unverified incident event pool 310, verified incident event 312, incident event block chain 314 for each particular incident event, and event existence proof pool 316.

Incident event detection module 302 detects a local incident event, the context of the local incident event, and any other information corresponding to the local incident event. Incident event detection module 302 may perform detection of local incident events and identification of the event information corresponding to the detected local incident events by using, for example, mobile apparatus mounted sensors, such as cameras, microphones, global positioning system transceivers, and the like. Incident event detection module 302 may further report an incident event transaction via a P2P network in accordance with a predetermined report policy when detecting the local incident event.

The predetermined report policy may, for example, describe conditions for reporting incident event transactions by incident event detection module 302. In one example, incident event detection module 302 may automatically report all detected local incident events. In another example, a part of detected local incident events, which is permitted by a user of the mobile apparatus to be shared in an interactive manner, may be reported automatically by incident event detection module 302 or manually by the user.

Each incident event transaction may include, for example, a geographic location of the detected local incident event, time of the incident event, and a digital signature of the mobile apparatus as the issuer of the incident event information. Incident event detection module 302 may determine the specific geographic location of the detected local incident event by utilizing, for example, global positioning system coordinates (i.e., longitude and latitude) provided by a global positioning system transceiver of the mobile apparatus, address or name of roadway (e.g., U.S. ROUTE 66) with segment information provided by a navigation system of the mobile apparatus, and the like.

Incident event information verification module 304 may obtain an incident event transaction from unverified incident event pool 310, which may be reported by other mobile apparatus on the same roadway acting as incident event detectors. Incident event information verification module 304 also may communicate with a nearby mobile or immobile apparatus that acts as an event existence proof generator, such as event existence proof generator 204 in FIG. 2, to generate an event existence proof in response to encountering the nearby mobile or immobile apparatus. Incident event information verification module 304 may conduct the communication for generating the event existence proof by using a short-range wireless communication unit, which is typically used for vehicle-to-vehicle and/or vehicle-to-infrastructure communications if mobile apparatus 300 is a ground vehicle. Incident event information verification module 304 may issue an event existence proof transaction, which indicates an encounter between mobile apparatus 300 and the nearby mobile or immobile apparatus, via a network, such as network 102 in FIG. 1.

Incident event information verification module 304 may further verify existence of the unverified incident event in response to arriving at the geographic location reported in the incident event transaction. Incident event information verification module 304 may perform the verification of the existence of the unverified incident event by detecting the local incident event and its corresponding information regarding the area around the geographic location of the unverified incident event as the same or substantially similar to the information provided by incident event detection module 302. If the event information content corresponding to the local incident event matches the event information content of the unverified incident event as reported by incident event detection module 302, then verification by incident event information verification module 304 succeeds.

Incident event information verification module 304 may verify, in real time, unverified incident events that correspond to same or similar geographic locations and have same or similar event information content as relevant incident events. For example, incident event information verification module 304 may verify incident events corresponding to a specific narrow roadway location as relevant incident events. Incident event information verification module 304 may publish verified incident event 312 to add verified incident event 312 to a corresponding incident event block chain 314 in response to incident event information verification module 304 successfully verifying the existence of the unverified incident event. Verified incident event 312 may include, for example, a set of one or more incident event transactions that incident event information verification module 304 may verify together.

Instead of using a proof-of-work model, in which an exhaustive search is requested to find a cryptographic nonce that can make a hash value of an incident event block to satisfy a given criterion, illustrative embodiments may use mobile apparatus 300 to travel to the geographic location of the incident event as previously reported by another mobile apparatus to generate an incident event block in incident event block chain 314. A model where illustrative embodiments request that mobile apparatus 300, which includes incident event information verification module 304, to travel to the geographic location of the reported incident event by consuming fuel or electrical power may be referred to as "proof-of-drive" model.

Incident event information subscription module 306 may select a remote incident event of interest from among validated incident events occurring within a range of the P2P network. Illustrative embodiments may associate each validated incident event with a corresponding incident event block chain 314. Incident event information subscription module 306 may perform the selection of the remote incident event in accordance with a predetermined subscription policy, which may describe conditions for subscribing to event information. In one example, incident event information subscription module 306 may automatically subscribe to validated incident events corresponding to a scheduled or estimated route of mobile apparatus 300. Alternatively, the user of mobile apparatus 300 may manually subscribe to validated incident events corresponding to a scheduled or estimated route of mobile apparatus 300.

Mobile apparatus 300 may utilize obtained incident event information in a variety of forms. For example, mobile apparatus 300 may re-calculate a travel route by using real time up-to-date incident event information for dynamic routing. As another example, mobile apparatus 300 may display a popup notification on a display, such as an onboard navigation system screen, showing information, such as sightseeing information, parking status information, recklessly driven vehicle warning information, and the like. As a further example, mobile apparatus 300 may display a traffic congestion overlay on a road map of the navigation system. However, it should be noted that illustrative embodiments are not restricted to the aforementioned examples for utilizing the obtained event information. For example, alternative illustrative embodiments may use the obtained event information for geo-fencing, other positional-information-related services, and the like.

When one or more mobile apparatus continuously issue incident event notification transactions for a relevant incident event, illustrative embodiments may add incident event blocks corresponding to a verified incident event to incident event block chain 314 one after another. Illustrative embodiments may consider a longer incident event block chain corresponding a particular incident event as more reliable. An incident block closer to the end of an incident block chain may correspond to more recent information because a state of the incident event may change (e.g., hazard elimination or restriction escalation) as time proceeds. Therefore, mobile apparatus 300 may determine whether to utilize the information when considering the balance between the newness and continuity of the incident event information.

Event existence proof generation module 308 may communicate with a nearby mobile apparatus, which may act as an incident event information verifier, to generate an event existence proof in response to encountering the nearby mobile apparatus. Mobile apparatus 300 may conduct the communication for generating the event existence proof by using a short-range wireless communication unit, for example. Event existence proof generation module 308 may issue an event existence proof transaction, which indicates an encounter between mobile apparatus 300 and the nearby mobile apparatus, via the network.

Referring again to FIG. 2, incident event detector 202, event existence proof generator 204, incident event information verifier 206, and incident event information subscriber 210, may each be a different mobile apparatus, such as vehicles 104A-104D in FIG. 1. However, it should be noted that the aforementioned roles may be mutually interchangeable by using the components shown in the example of FIG. 3 in a manner that depends on the circumstances of a particular mobile apparatus.

For example, a mobile apparatus that acts as an incident event information subscriber also may act as an incident event information verifier when the mobile apparatus detects an unverified incident event that is similar to a validated incident event to verify the similar unverified incident event. Illustrative embodiments may expect the unverified incident event, which illustrative embodiments have not yet added to incident event block chain 314, to have the most up-to-date information. In addition, such an aggressive verification process may lead to lengthening incident event block chain 314, which increases the reliability of the incident event information managed by incident event block chain 314.

In particular illustrative embodiments, each of modules 302, 304, 306, and 308 may be implemented as a software module including program instructions and/or data structures in conjunction with hardware components, such as a processor, a memory, a storage device, and the like; a hardware module including electronic circuitry; or a combination thereof. It should be noted that all modules 302, 304, 306, and 308 are implemented on mobile apparatus 300. However, it should be noted that alternative illustrative embodiments may omit a portion of modules 302, 304, 306, and 308 from mobile apparatus 300.

Figure 4:
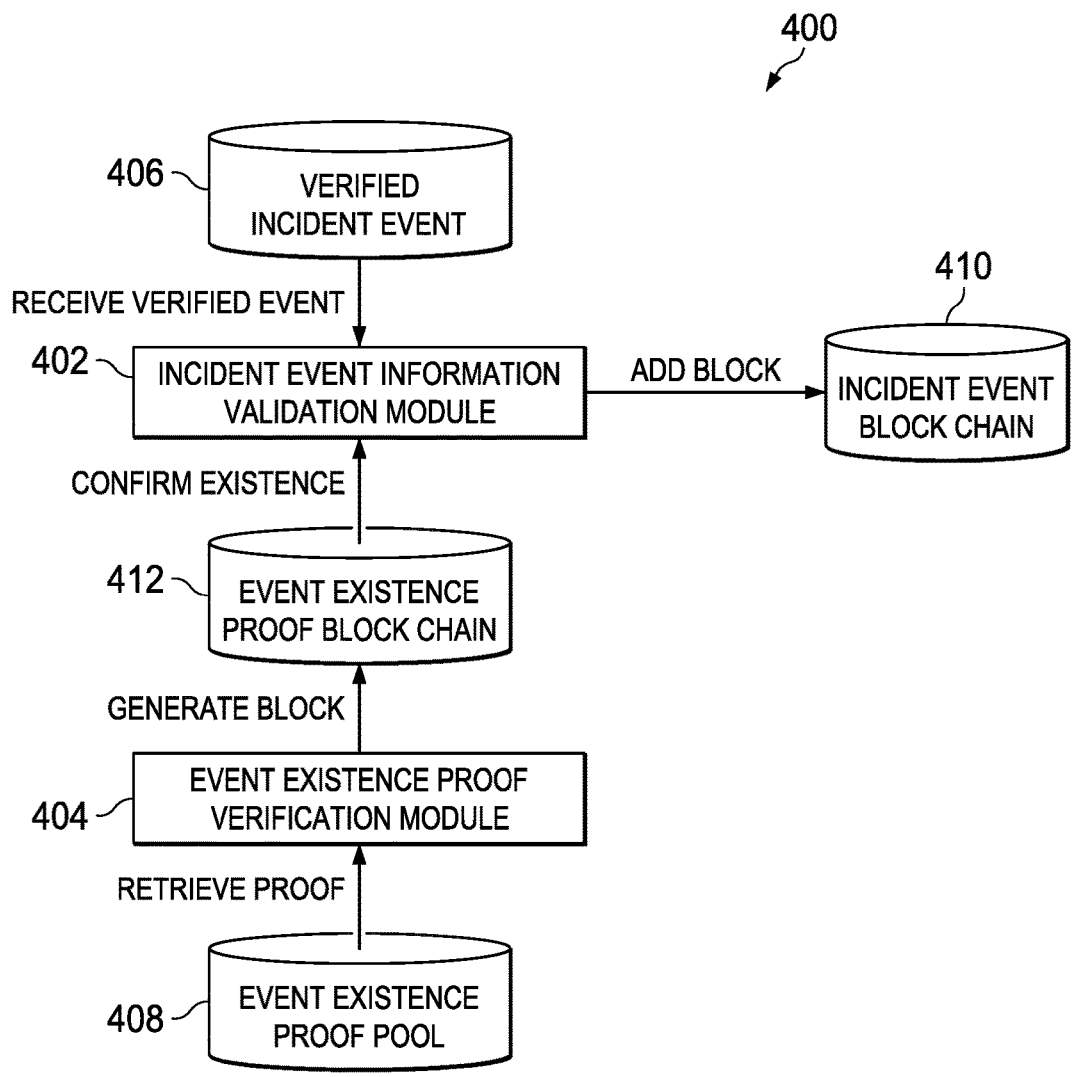
FIG. 4 is a diagram illustrating a set of example components implemented on a computing node in accordance with an illustrative embodiment.

With reference now to FIG. 4, a diagram illustrating a set of example components implemented on a computing node is depicted in accordance with an illustrative embodiment. Components 400 may include, for example, incident event information validation module 402 and event existence proof verification module 404. The example of FIG. 4 also shows verified incident event 406, event existence proof pool 408, incident event block chain 410, and event existence proof block chain 412.

Event existence proof verification module 404 may retrieve one or more event existence proof transactions from event existence proof pool 408. Event existence proof verification module 404 also may verify the one or more existence proof transactions in terms of physical (i.e., geographic location) consistency with other event existence proof transactions. Each event existence proof transaction may indicate an encounter between one mobile apparatus that may act as an incident event information verifier, such as incident event information verifier 206 in FIG. 2, and another mobile or immobile apparatus that may act as an event existence proof generator, such as event existence proof generator 204 in FIG. 2.

Event existence proof verification module 404 may generate an event existence proof block that comprises event existence proof block chain 412 in response to event existence proof verification module 404 successfully verifying the retrieved event existence proof transactions. The generated event existence proof block may include, for example, one or more verified event existence proof transactions. Illustrative embodiments may utilize a proof-of-work model to generate a new event existence proof block for a given challenge level.

After successfully generating the event existence proof block for the given challenge level, event existence proof verification module 404 may publish the newly generated existence proof block to add it to event existence proof block chain 412. Alternatively, if event existence proof verification module 404 receives an event existence proof block, which was published by another computing node, indicating failure of the verification, then event existence proof verification module 404 may validate the event existence proof block published by the other computing node and add that event existence proof block to event existence proof block chain 412. Another computing node (i.e., an incident event information validator) may use the one or more verified event existence proof transactions to validate the verified incident event published by a mobile apparatus (i.e., an incident event information verifier).

Incident event information validation module 402 may receive a verified incident event, which was published by a mobile apparatus acting as an incident event information verifier, and obtain one or more event existence proof transactions specified in the verified incident event by referring to event existence proof block chain 412. As described above, the verified incident event may include, for example, a list of the event existence proof transactions, each transaction indicating an encounter between the mobile apparatus and another mobile apparatus or an immobile apparatus via the P2P network.

Incident event information validation module 402 may validate the verified incident event using the one or more event existence proof transactions in terms of geographic locations of the mobile apparatus before and/or after verification. After confirming that the one or more event existence proof transactions indicate existence of the mobile apparatus being located at the geographic location of the verified incident event and a time corresponding to verification, incident event information validation module 402 may add the verified incident event to the incident event block chain 410, which illustrative embodiments may use to manage relevant incident events to the verified incident event.

In particular illustrative embodiments, incident event information validation module 402 and event existence proof verification module 404 may be implemented as software modules including program instructions and/or data structures in conjunction with hardware components, such as a processor, a memory, a storage device, and the like; a hardware module including electronic circuitry; or a combination thereof. It should be noted that both incident event information validation module 402 and event existence proof verification module 404 are implemented on a single computing node. However, alternative illustrative embodiments may omit either incident event information validation module 402 or event existence proof verification module 404 from the single computing node.

Also, a mobile apparatus, such as mobile apparatus 300 in FIG. 3, may have similar components as those of components 400 if sufficient resources of the mobile apparatus are available. For example, the mobile apparatus may implement incident event information validation module 402 and/or event existence proof verification module 404 to participate in the validation of a verified incident event published by another mobile apparatus and/or verification of the event existence proof transactions issued by another mobile apparatus. If incident event information validation module 402 is implemented on the mobile apparatus, then illustrative embodiments may request that the mobile apparatus allocate enough resources to store event existence proof block chain 412.

Figure 5:
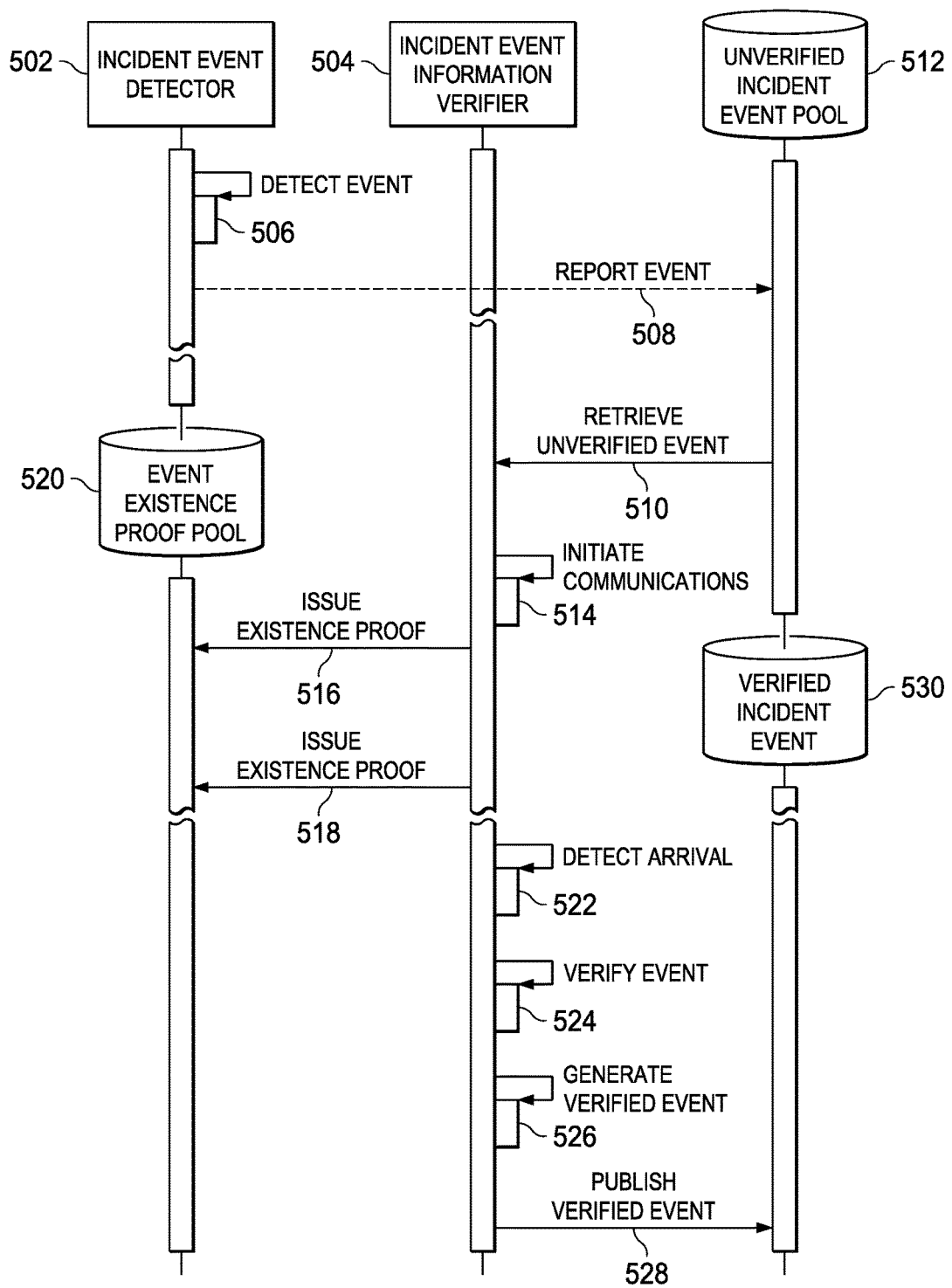
FIG. 5 is a sequence diagram depicting a process flow from detection of event information to publication of verified event information in accordance with an illustrative embodiment.

With reference now to FIG. 5, a sequence diagram depicting a process flow from detection of event information to publication of verified event information is depicted in accordance with an illustrative embodiment. It should be noted that illustrative embodiments perform the process flow shown in FIG. 5 between incident event detector 502 and incident event information verifier 504, such as incident event detector 202 and incident event information verifier 206 in FIG. 2.

At step 506, incident event detector 502 detects a local incident event and its corresponding event information content. At step 508, incident event detector 502 reports an unverified incident event by issuing an incident event transaction via a P2P network for verification. At step 510, incident event information verifier 504 retrieves one or more unverified incident events from unverified incident event pool 512, such as unverified incident event pool 212 in FIG. 2. A respective incident event detector within the P2P network may issue a corresponding unverified incident event.

At step 514, incident event information verifier 504 initiates communications for generating event existence proofs. At step 516 and step 518, incident event information verifier 504, while en route to the geographic location of the incident event, issues an event existence proof transaction in response to encountering a respective mobile apparatus or immobile apparatus acting as an event existence proof generator, such as event existence proof generator 204 in FIG. 2. Illustrative embodiments may store the event existence proof transactions in event existence proof pool 520, such as event existence proof pool 218 in FIG. 2.

At step 522, incident event information verifier 504 detects arrival at the geographic location reported in the retrieved unverified incident events. At step 524, upon arrival incident event information verifier 504 verifies existence of the one or more unverified incident events by detecting the local incident event and any associated incident event information regarding the geographic location of the one or more unverified incident events. At step 526, incident event information verifier 504 generates a verified incident event, which may include a group of incident event transactions that illustrative embodiments determine to be relevant. At step 528, incident event information verifier 504 publishes verified incident event 530 in response to a successful verification of the one or more unverified incident events. Verified incident event 530 may be, for example, verified incident event 214 in FIG. 2.

Figure 6:
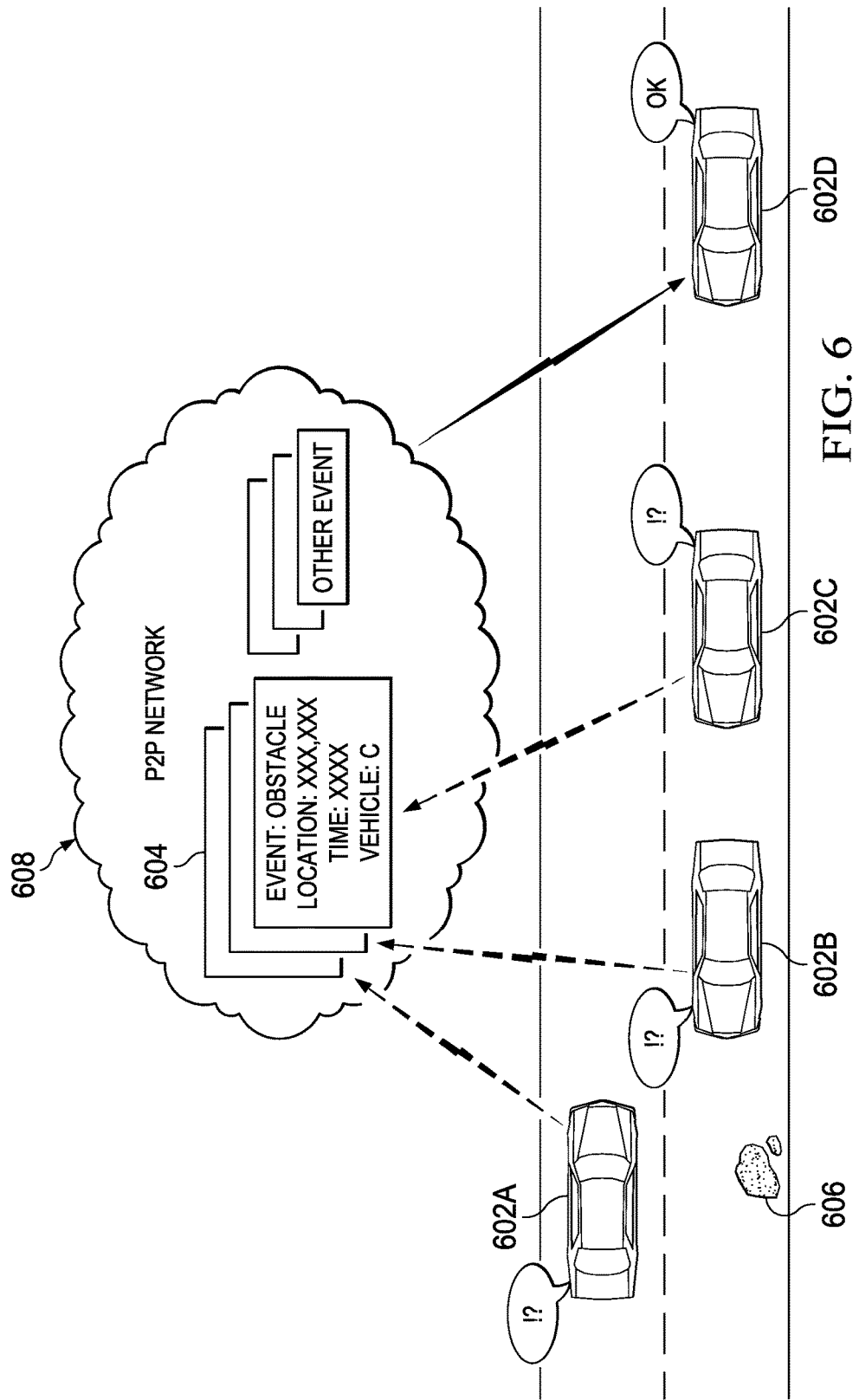
FIG. 6 is a diagram illustrating an example of reporting an unverified incident event by respective incident event detectors in accordance with an illustrative embodiment.

With reference now to FIG. 6, a diagram illustrating an example of reporting an unverified incident event by respective incident event detectors is depicted in accordance with an illustrative embodiment. The respective incident event detectors may be, for example, incident event detectors 202 in FIG. 2. Mobile apparatus, such as vehicle 602A, 602B, and 604C, which act as the respective incident event detectors, may issue multiple incident event transactions 604 corresponding to identical incident event 606. Vehicle 602A, 602B, and 604C may transmit or issue multiple incident event transactions 604 to nearby vehicle 602D via P2P network 608. Nearby vehicle 602D may become an incident event information verifier, such as incident event information verifier 206 in FIG. 2, for identical incident event 606.

Figure 7:
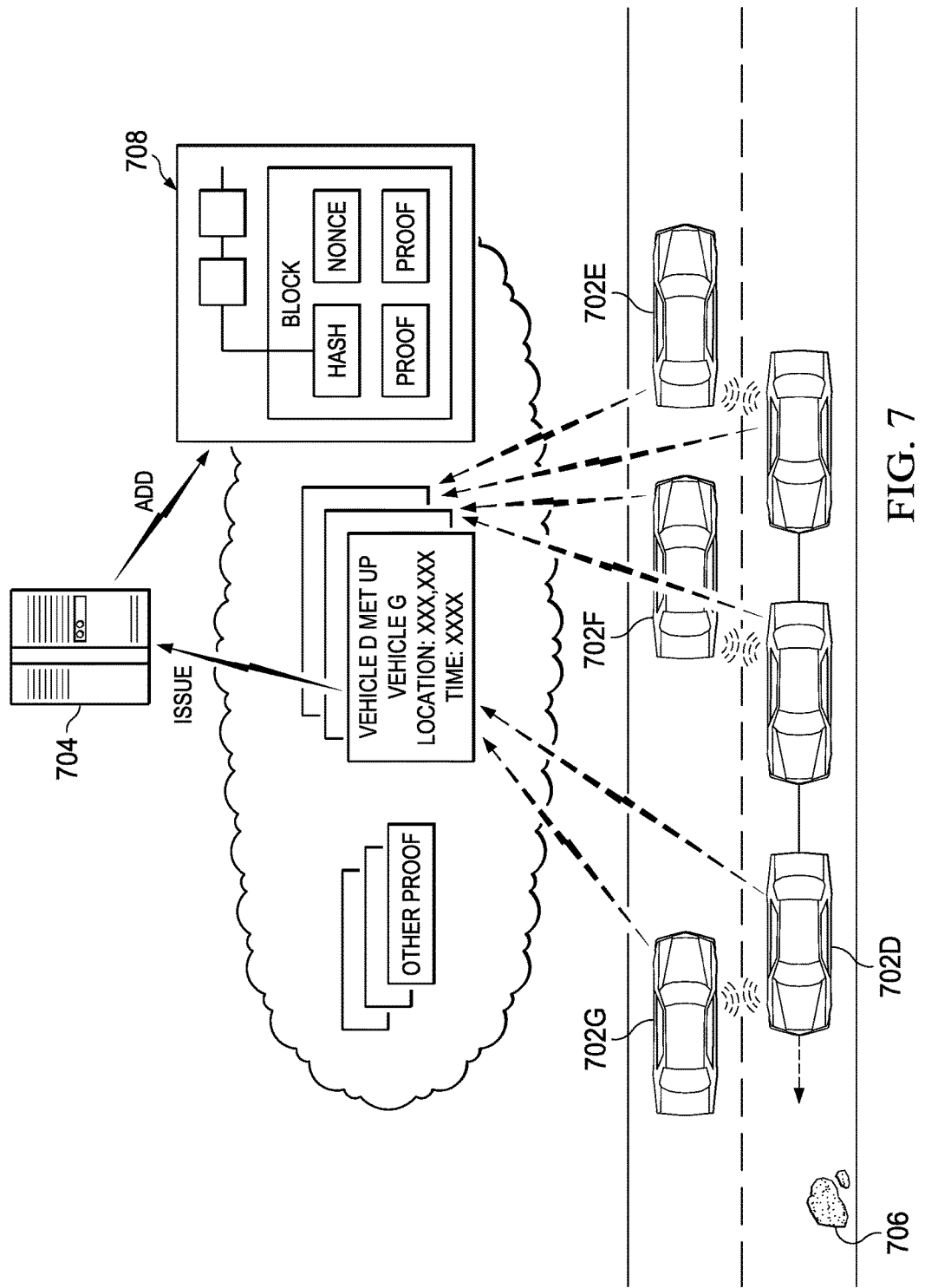
FIG. 7 is a diagram illustrating an example of generating event existence proofs by an incident event information verifier and a subsequent event existence proof verification process by an event existence proof verifier in accordance with an illustrative embodiment.

With reference now to FIG. 7, a diagram illustrating an example of generating event existence proofs by an incident event information verifier and a subsequent event existence proof verification process by an event existence proof verifier is depicted in accordance with an illustrative embodiment. As illustrated in FIG. 7, multiple event existence proof transactions relating to nearby vehicle 702D, which is acting as an incident event information verifier in this example, are issued by both parties at each encounter with vehicle 702E, vehicle 702F, and vehicle 702G, respectively, that act as an event existence proof generator. Computing node 704, which is acting as an event existence proof verifier, verifies the issued event existence proof transactions corresponding to obstruction 706 and adds the verified event existent proof transactions to event existence proof block chain 708 after verification.

Figure 8:
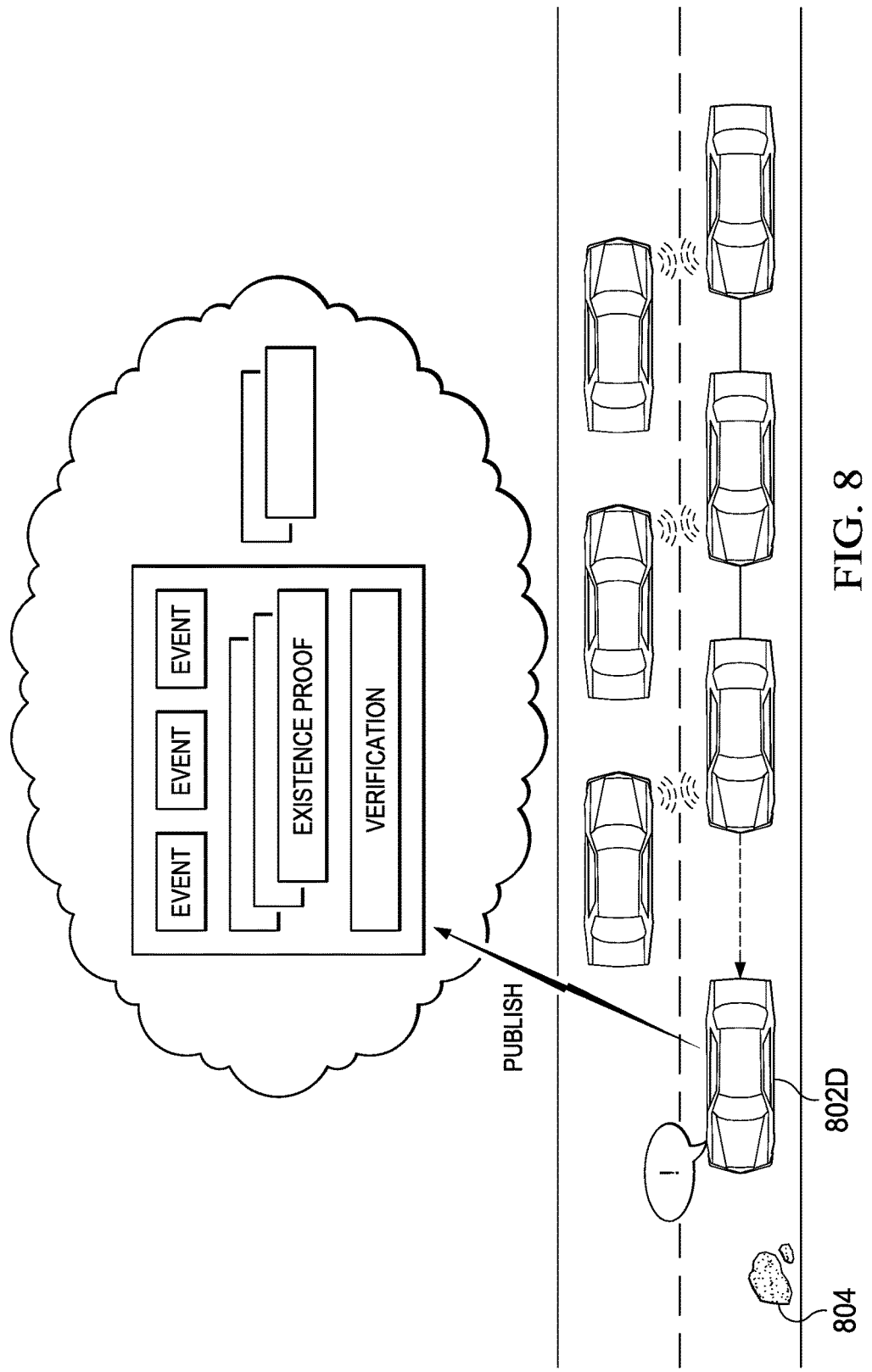
FIG. 8 is a diagram illustrating an example of verifying an unverified incident event by an incident event information verifier to publish a verified incident event in accordance with an illustrative embodiment.

With reference now to FIG. 8, a diagram illustrating an example of verifying an unverified incident event by an incident event information verifier to publish a verified incident event is depicted in accordance with an illustrative embodiment. As illustrated in FIG. 8, upon arriving at the geographic location of the unverified incident event, vehicle 802D, which is acting as an incident event information verifier in this example, determines whether the reported incident event is the same or substantially equal to what is currently occurring at the geographic location of obstruction 804. After verifying the reported incident event information corresponding to obstruction 804, vehicle 802D generates a verified incident event including one or more incident event transactions (each incident event transaction includes event content, time, and geographic location) corresponding to the incident event; a list of event existence proof transactions generated during a period of time from when vehicle 802D detected the incident event until vehicle 802D arrives at the geographic location of the incident event; and the verification, which includes a digital signature of the vehicle 802D.

Figure 9:
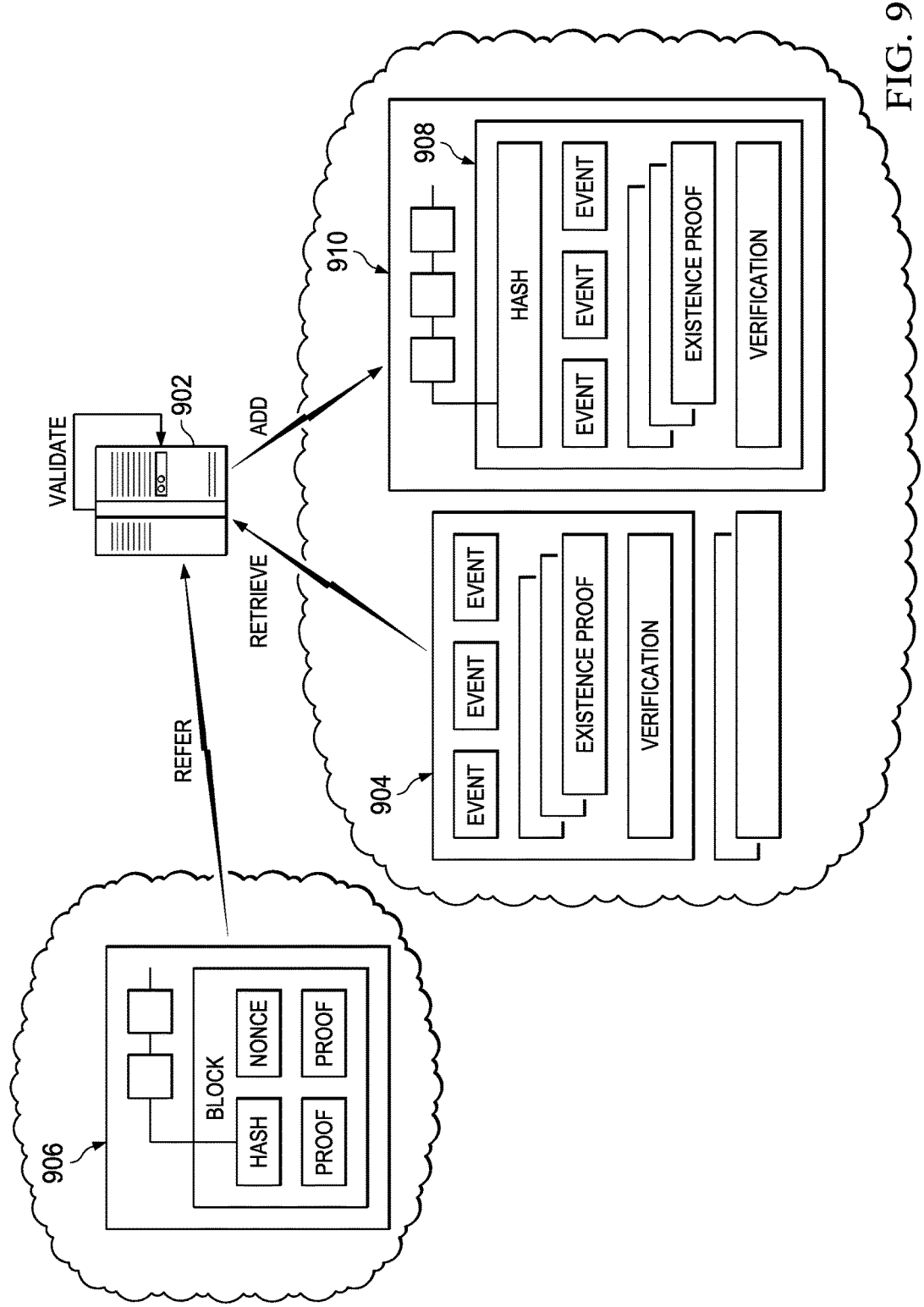
FIG. 9 is a diagram illustrating an example of validating a verified incident event by an incident event information validator in accordance with an illustrative embodiment.

With reference now to FIG. 9, a diagram illustrating an example of validating a verified incident event by an incident event information validator is depicted in accordance with an illustrative embodiment. Computing node 902, which is acting as the incident event information validator, retrieves verified incident event 904, which a mobile apparatus acting as an incident event information verifier, such as vehicle 802D in FIG. 8, publishes. Computing node 902 may be, for example, computing node 106A in FIG. 1.

In addition, computing node 902 refers to event existence proof block chain 906 to obtain one or more event existence proof transactions specified in verified incident event 904. Further, computing node 902 validates verified incident event 904 using the one or more event existence proof transactions in terms of geographic locations of the mobile apparatus acting as the incident event information verifier before and/or after the verification. Furthermore, computing node 902 generates verified event block 908, which includes verified incident event 904 and a hash of verified event block 908, and adds verified event block 908 to incident event block chain 910.

Figure 10:
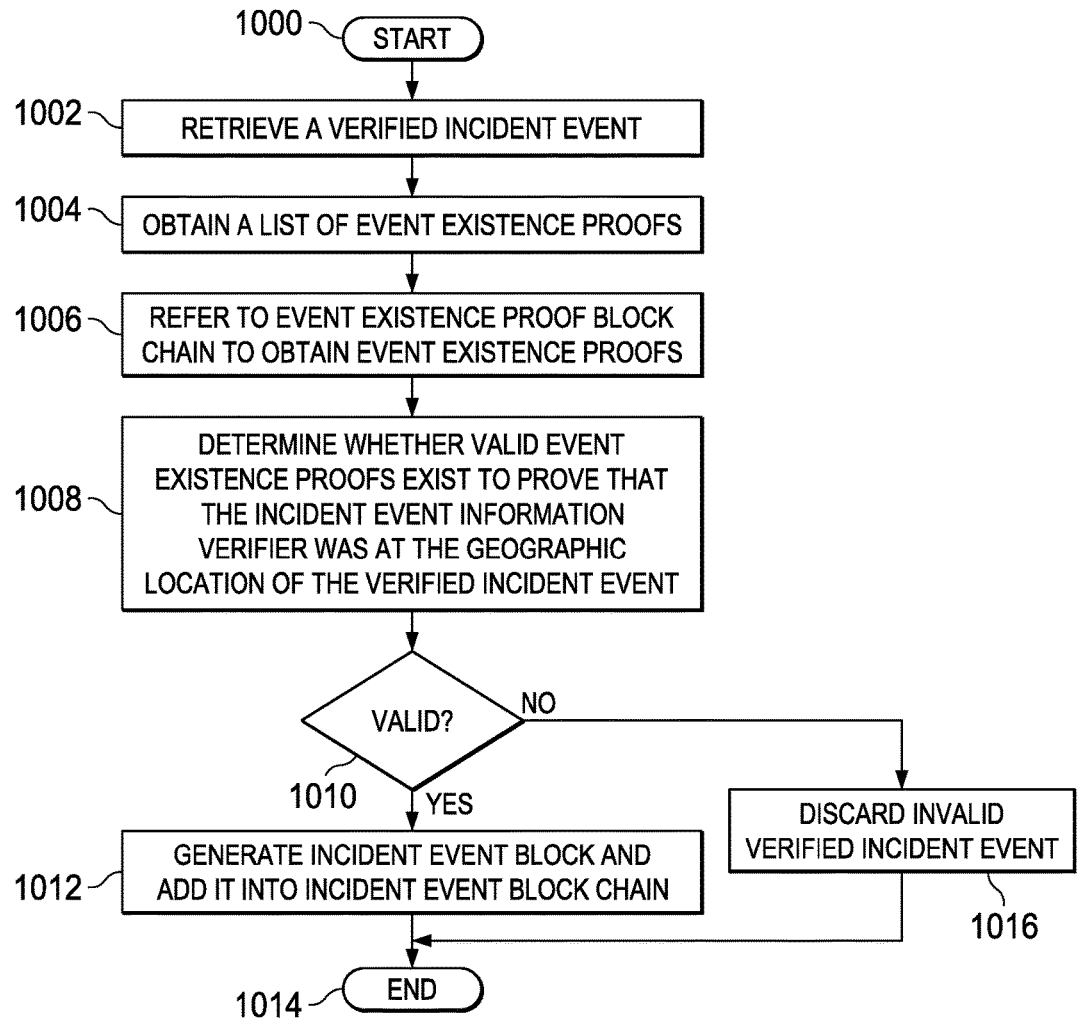
FIG. 10 is a flowchart illustrating a process executed by a computing node for validating event information in accordance with an illustrative embodiment.

With reference now to FIG. 10, a flowchart illustrating a process executed by a computing node for validating event information is shown in accordance with an illustrative embodiment. The computing node may be, for example, computing node 902 in FIG. 9. Moreover, the computing node is acting as an incident event information validator, such as incident event information validator 208 in FIG. 2.

The process begins in response to the computing node initiating a validation process in accordance with a predefined policy, which defines conditions for the computing node to participate in the validation process (step 1000). The computing node retrieves a verified incident event (step 1002). A mobile apparatus acting as an incident event information verifier publishes the verified incident event.

In addition, the computing node obtains a list of event existence proof transactions from the verified incident event (step 1004). Illustrative embodiments may provide the list in the form of a list of identifiers of the event existence proof transactions or a list of links to the event existence proof transactions. The computing node also refers to an event existence proof block chain to obtain the one or more event existence proof transactions specified in the verified incident event (step 1006). [Also see FIG. 9, "REFER"]. Further, the computing node attempts to validate the verified incident event using the one or more event existence proof transactions in terms of geographic locations of the incident event information verifier before and/or after the verification. [Also see FIG. 9, "VALIDATE" ].

Furthermore, the computing node determines whether valid event existence proof transactions exist to prove that the incident event information verifier was actually at the geographic location of the verified incident event, which the computing device retrieved (step 1008). Moreover, the computing node makes a determination as to whether the computing node successfully validated the verified incident event (step 1010). If the computing node determines that the validated event existence proof transactions prove that the incident event information verifier was actually at the geographic location of the verified incident event, yes output of step 1010, then the computing node generates a verified event block, such as verified event block 906 in FIG. 9, which includes the verified incident event and a hash of the verified event block, and adds the verified event block to an incident event block chain, such as incident event block chain 908 in FIG. 9 (step 1012). [Also see FIG. 9, "ADD"]. Thereafter, the process terminates (step 1014).

Returning again to step 1010, if the computing node determines that no valid event existence proof transactions exist proving that the incident event information verifier was actually at the geographic location of the verified incident event, no output of step 1010, then the computing node discards the invalid verified incident event (step 1016). Thereafter, the process returns to step 1014 where the process terminates.

Figure 11:
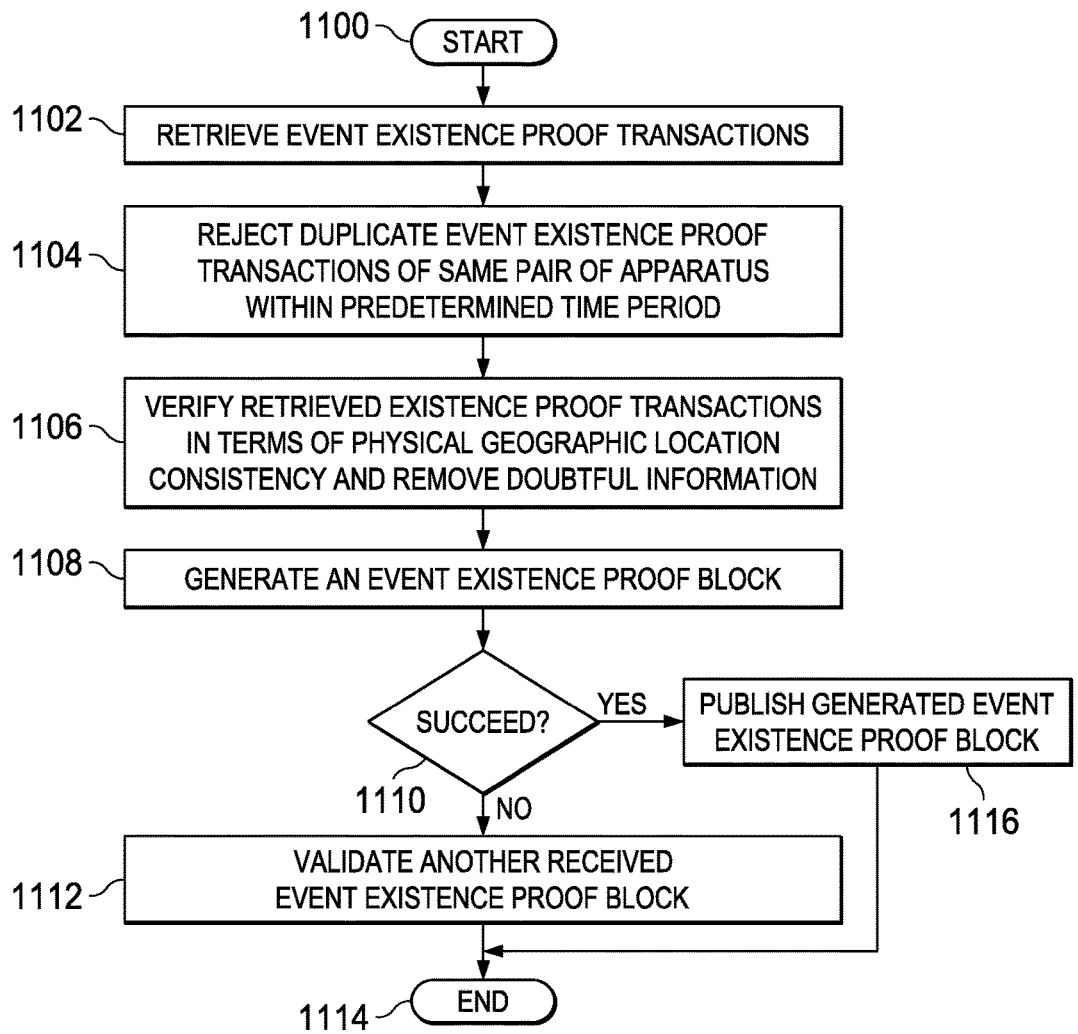
FIG. 11 is a flowchart illustrating a process executed by a computing node for verifying event existence proof of a mobile apparatus being at a specific geographic location, at a specific time in accordance with an illustrative embodiment.

With reference now to FIG. 11, a flowchart illustrating a process executed by a computing node for verifying event existence proof of a mobile apparatus being at a specific geographic location, at a specific time is shown in accordance with an illustrative embodiment. The computing node may be, for example, computing node 160B in FIG. 1. Moreover, the computing node is acting as an event existence proof verifier, such as event existence proof verifier 222A in FIG. 2.

The process begins in response to the computing node initiating a verification process in accordance with a predefined policy, which defines conditions for the computing node to participate in the verification of event existence proofs (step 1100). The computing node retrieves one or more event existence proof transactions (step 1102). A mobile apparatus, which is acting as an incident event information verifier, may issue an event existence proof transaction. Each event existence proof transaction indicates an encounter between the mobile apparatus acting as the incident event information verifier and a respective mobile apparatus or an immobile apparatus, which is acting as an event existence proof generator.

The computing node rejects duplicate event existence proof transactions issued by a same pair of apparatus within a predetermined time period (step 1104). To suppress tampering by a plurality of apparatus conspiring to generate false event existence proof transactions between each other, illustrative embodiments may only consider one or a few event existence proof transactions that are issued by the same pair of apparatus within a predetermined period of time for verification. Thus, even when an identical pair of apparatus generate a plurality of event existence proof transactions within a predetermined period of time, illustrative embodiments may ignore the second and subsequent event existence proof transactions issued by this same pair of apparatus.

The computing node verifies retrieved event existence proof transactions in terms of geographic location and time consistency by comparing the retrieved event existence proof transactions with other event existence proof transactions generated by other apparatus. Further, the computing node removes doubtful event existence proof transactions with a contradiction in terms of geographic location and/or time consistency (step 1106). To suppress disguise by high performance computers pretending to be a plurality of mobile apparatus and issuing a massive amount of false event existence proof transactions, each mobile apparatus may store a digital certificate (e.g., a secret key), which a trusted certificate authority may generate and issue at the time each mobile apparatus is manufactured, for example.

Afterward, the computing node attempts to generate an event existence proof block, which includes the verified event existence proof transactions under a given challenge level (step 1108). The computing node makes a determination as to whether the generation of the event existence proof block succeeded (step 1110). If the computing node determines that the generation of the event existence proof block failed, no output of step 1110, then the computing node validates another received event existence proof block (step 1112). In addition, the computing device adds the other event existence proof block to an event existence proof block chain when receiving the other event existence proof block published by another event existence proof verifier. Thereafter, the process terminates (step 1114).

Returning again to step 1110, if the computing node determines that the generation of the event existence proof block succeeded, yes output of step 1110, then the computing node publishes the newly generated event existence proof block (step 1116). Thereafter, the process returns to step 1114 where the process terminates. It should be noted that another computing node acting as an incident event information validator uses the one or more verified event existence proof transactions stored in the event existence proof block chain.

Figure 12:
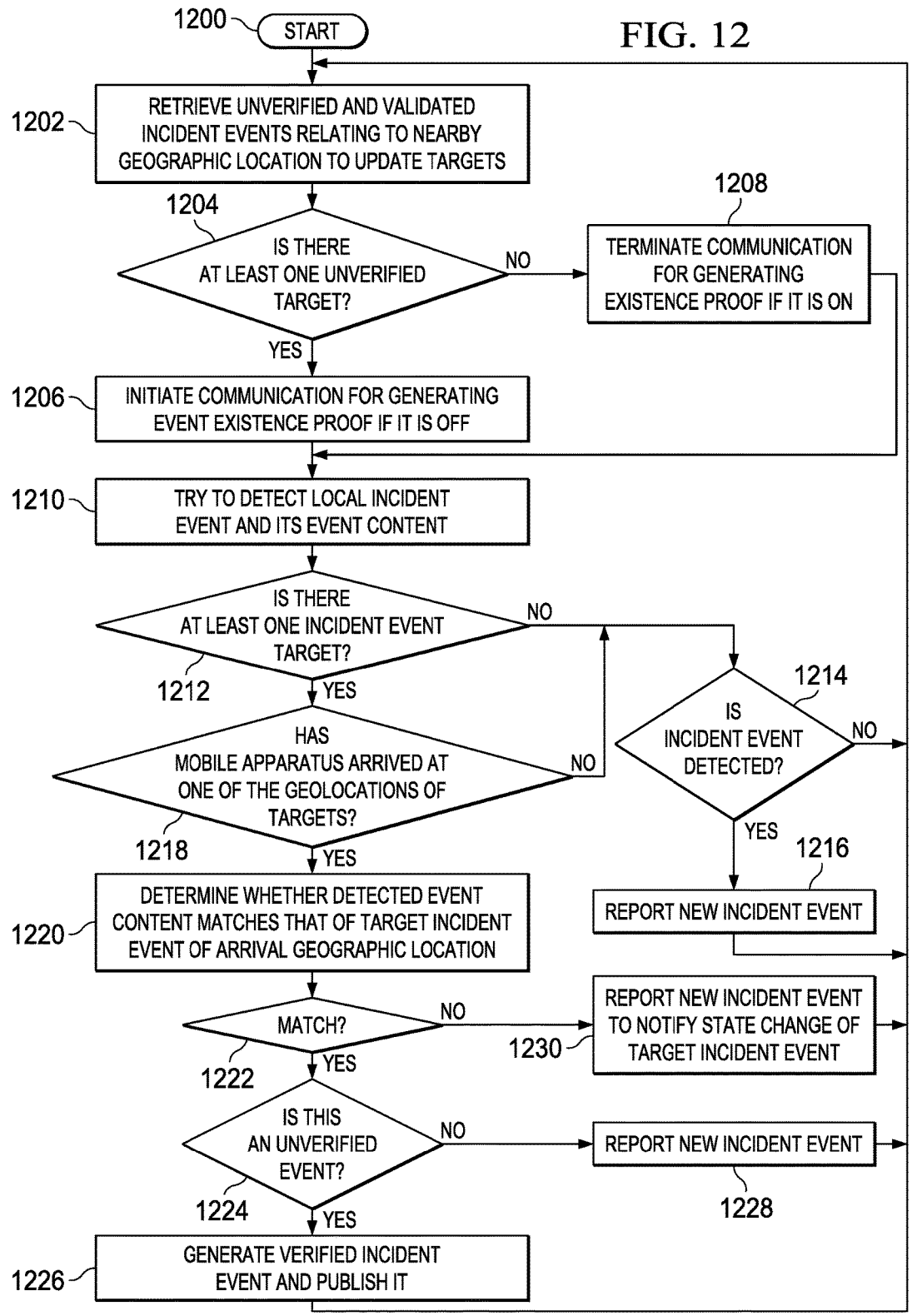
FIG. 12 is a flowchart illustrating a process executed by the mobile apparatus for verifying incident event information, detecting incident event information, and subscribing incident event information in accordance with an illustrative embodiment.

With reference now to FIG. 12, a flowchart illustrating a process executed by the mobile apparatus for verifying incident event information, detecting incident event information, and subscribing incident event information is shown in accordance with an illustrative embodiment. The process executed by the mobile apparatus verifies the incident event information, which is shared among a plurality of mobile apparatus. It should be noted that one mobile apparatus acting as an incident event information verifier, an incident event detector, and an incident event subscriber may perform the process depending upon the circumstances of the mobile apparatus.

The process begins in response to starting the mobile apparatus (step 1200). The mobile apparatus retrieves one or more unverified and validated incident events (i.e., an incident event block chain for each validated incident event published in a P2P network) corresponding to a geographic location nearby the mobile apparatus to update incident event targets for monitoring (step 1202). The mobile apparatus may subscribe to information of the validated incident events corresponding to the nearby geographic location to utilize the information as the incident event information subscriber. Furthermore, the mobile apparatus also may retrieve an unverified incident event similar to one of the validated incident events as an incident event target for monitoring.

The mobile apparatus determines whether there is at least one unverified incident event in the incident event targets for monitoring (step 1204). If the mobile apparatus determines that there is at least one unverified incident event in the incident event targets for monitoring, yes output of step 1204, then the mobile apparatus initiates communication for generating an event existence proof transaction (step 1206). At this step, the mobile apparatus acts as an incident event information verifier. Thereafter, the process proceeds to step 1210. If the mobile apparatus determines that there is no unverified incident event in the incident event targets for monitoring, no output of step 1204, then the mobile apparatus terminates communication for generating an event existence proof transaction (step 1208). In this step, the mobile apparatus acts as an incident event detector.

The mobile apparatus tries to detect a local incident event and its associated event content (step 1210). The mobile apparatus makes a determination as to whether there is at least one incident event in the incident event targets for monitoring (step 1212). If the mobile apparatus determines that there is no incident event in the incident event targets for monitoring, no output of step 1212, then the mobile apparatus makes a further determination as to whether the mobile apparatus has detected the local incident event (step 1214). If the mobile apparatus determines that the local incident event has not been detected, no output of step 1214, then the process returns to step 1202. If the mobile apparatus determines that the local incident event has been detected, yes output of step 1214, then the mobile apparatus reports the detected local incident event as a new incident event (step 1216). In this step, the mobile apparatus acts as the incident event information detector. It should be noted that other mobile apparatus verify this new incident event. Thereafter, the process returns to step 1202.

Returning again to step 1212, if the mobile apparatus determines that there is at least one incident event in the incident event targets for monitoring, yes output of step 1212, then the mobile apparatus makes a further determination as to whether the mobile apparatus has arrived at one of the geographic locations of the target incident events (step 1218). If the mobile apparatus determines that the mobile apparatus has not arrived at any of the geographic locations of the target incident events, no output of step 1218, then the process returns to step 1214. If the mobile apparatus determines that the mobile apparatus has arrived at one of the geographic locations of the target incident events, yes output of step 1218, then the mobile apparatus determines whether the detected event content matches that of the target incident event at the arrival geographic location (step 1220).

The mobile apparatus makes a determination as to whether the detected event content corresponding to the local incident event matches reported event content upon arrival at the geographic location (step 1222). If the mobile apparatus determines that the detected event content corresponding to the local incident event does match the reported event content upon arrival at the geographic location, yes output of step 1222, then the mobile apparatus makes a further determination as to whether the detected incident event at the arrival geographic location is an unverified incident event (step 1224).

If the mobile apparatus determines that the detected incident event at the arrival geographic location is an unverified incident event, yes output of step 1224, then the mobile apparatus generates a verified incident event, which includes the detected incident event and other relevant incident events, and publishes the verified incident event (step 1226). In this step, the mobile apparatus acts as an incident event information verifier. Thereafter, the process returns to step 1202.

Returning again to step 1224, if the mobile apparatus determines that the detected incident event at the arrival geographic location is not an unverified incident event, no output of step 1224, then the mobile apparatus reports the detected incident event, which may be identical to the validated incident event of the target incident event, as a new unverified incident event (step 1228). In this step, the mobile apparatus acts as an incident event detector. Other mobile apparatus verify this new incident event, which leads to a lengthening of the corresponding incident event block chain. Thereafter, the process returns to step 1202.

Returning again to step 1222, if the mobile apparatus determines that the detected event content corresponding to the local incident event does not match the reported event content upon arrival at the geographic location, no output of step 1222, then the mobile apparatus reports the new incident event indicating a state change of the target incident event no matter whether the target incident event at the arrival geographic location is an unverified incident event or not (step 1230). In this step, the mobile apparatus acts as an incident event detector. Other mobile apparatus verify this new incident event and illustrative embodiments validate the new incident event via the aforementioned mechanism. In this step, illustrative embodiments may branch the corresponding incident event block chain and add the incident event block indicating the change in state. When the addition of the incident event blocks with the changed state becomes predominant, illustrative embodiments regard the state of the incident event as having changed.

At step 1230, the mobile apparatus also may report the new incident event indicating clearance of the target incident event as the state change in response to the mobile apparatus failing to detect the local incident event upon arrival at the geographic location. When the addition of the incident event blocks indicating that the incident event has been cleared becomes predominant, illustrative embodiments regard the incident event as having been cleared and delete the corresponding incident event block chain for the cleared incident event after a predetermined period of time. All incident event information validators discard their own incident event block chain within a predetermined time period after recognizing the clearance of the incident event. Thereafter, the process returns to step 1202.

Figure 13:
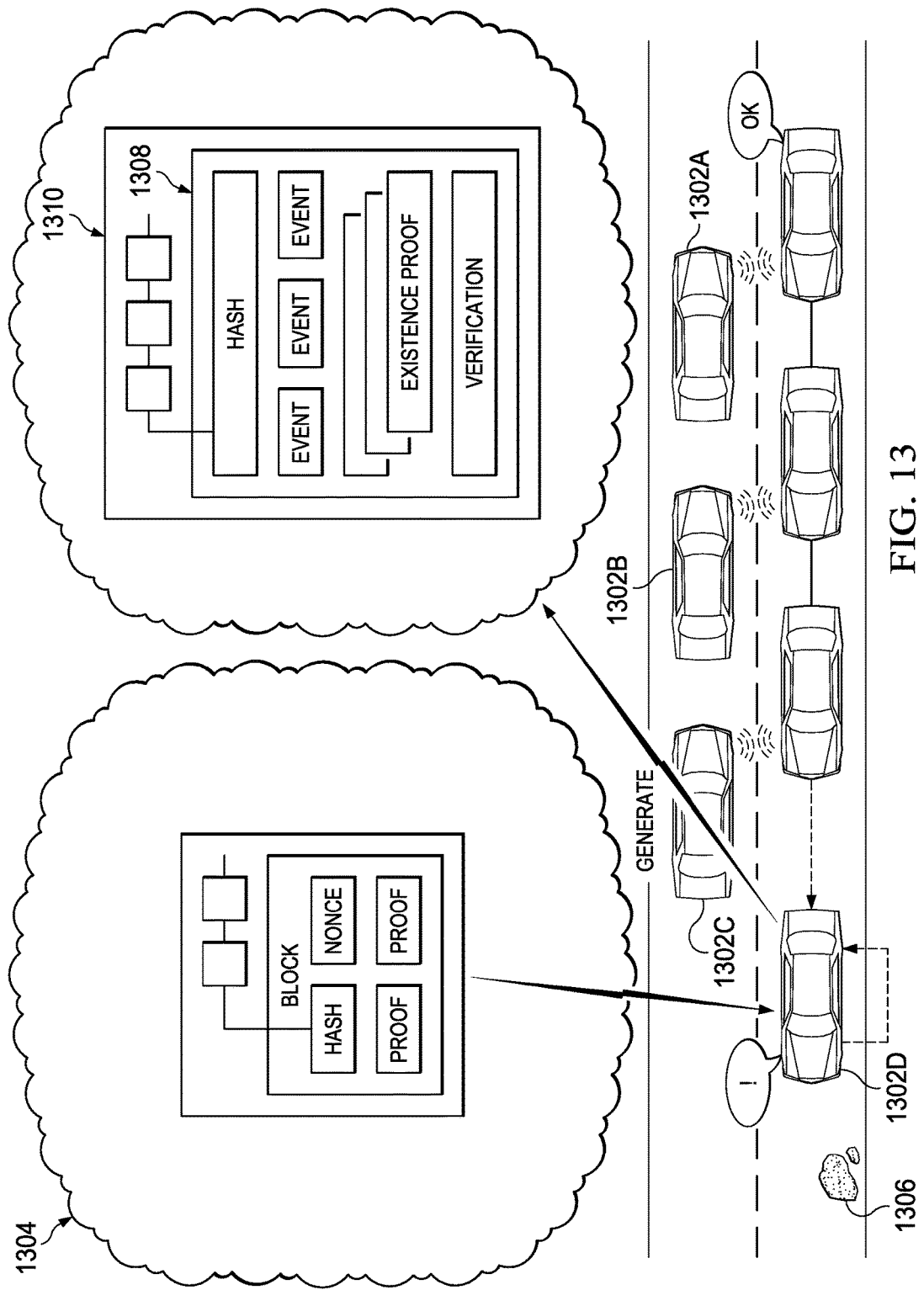
FIG. 13 is a diagram illustrating an example of a mobile apparatus acting as an incident event information verifier and an incident event information validator in accordance with an alternative illustrative embodiment.

With reference now to FIG. 13, a diagram illustrating an example of a mobile apparatus acting as an incident event information verifier and an incident event information validator is depicted in accordance with an alternative illustrative embodiment. Mobile apparatus, such as vehicles 1302A, 1302B, and 1302C traveling in an opposite direction as vehicle 1302D, may issue a respective incident event transaction 1304 corresponding to an incident event, such as obstruction 1306, when detecting the incident event. Vehicles 1302A, 1302B, and 1302C transmit respective incident event transactions 1304 to nearby vehicle 1302D. Nearby vehicle 1302D may become an incident event information verifier and an incident event information validator for obstruction 1306.

Upon arrival at the geographic location corresponding to the unverified incident event (i.e. obstruction 1306), vehicle 1302D acts as the incident event information verifier by determining whether the detected incident event as previously reported in issued incident event transactions is equal to what is currently occurring at the geographic location. After verifying the incident event, vehicle 1302D generates verified event block 1308, which includes the verified incident event. Vehicle 1302D may directly chain verified event block 1308 with incident event block chain 1310 corresponding to obstruction 1306. To determine which incident event block chain to chain verified event block 1308 to, vehicle 1302D may refer to an event existence proof block chain to validate whether or not the last chained event block contains valid event existence proof transactions. In this situation, illustrative embodiments may request that vehicle 1302D store or refer to the event existence proof block chain.

Figure 14:
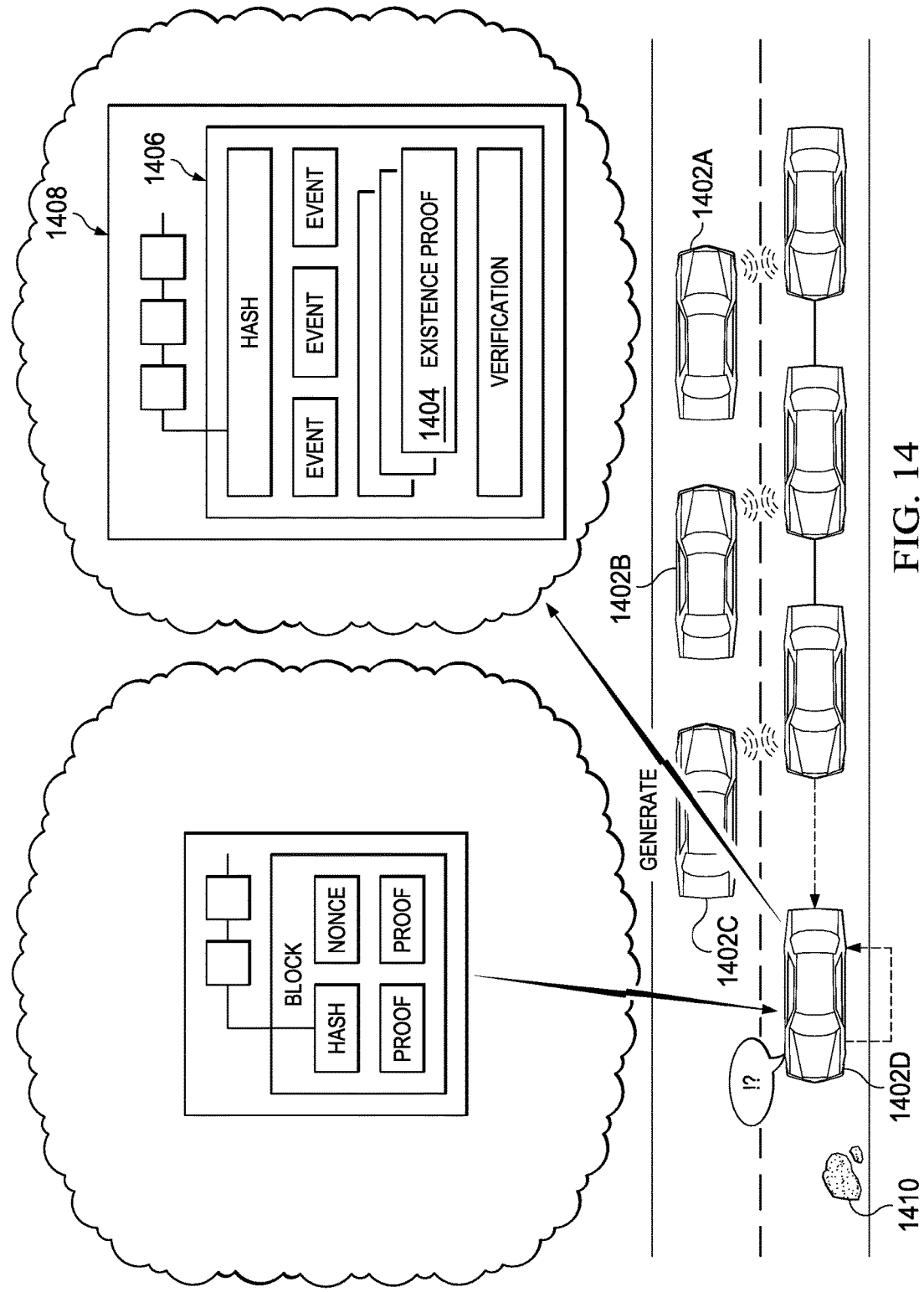
FIG. 14 is a diagram illustrating an example of a mobile apparatus acting as an incident event detector, an incident event information verifier, and an incident event information validator in accordance with another alternative illustrative embodiment.

With reference now to FIG. 14, a diagram illustrating an example of a mobile apparatus acting as an incident event detector, an incident event information verifier, and an incident event information validator in accordance with another alternative illustrative embodiment. In this example, vehicle 1402D communicates with other nearby passing vehicles, such as 1402A, 1402B, and 1402C, and generates event existence proof transactions 1404 to declare where vehicle 1402D is geographically located and at what time. Vehicle 1402D may place event existence proof transactions 1404 in event existence proof block 1406. Further, vehicle 1402D may place event existence proof block 1406 in event existence proof block chain 1408 after being verified in terms of physical geographic location consistency of the set of the event existence proof transactions by an event existence proof verifier.

Vehicle 1402D acting as the incident event detector and the incident event information verifier, may detect obstruction 1410 as the local incident event and generate a verified event block including a verified incident event, which may include information associated with obstruction 1410 and a list of the event existence proofs generated over a given time period prior to vehicle 1402D reaching the geographic location of obstruction 1410. Vehicle 1402D may chain the verified event block in the corresponding incident event block chain. To determine which incident event block chain to place the verified event block within, vehicle 1402D may refer to the event existence proof block chain to validate whether or not the last chained event block contains valid event existence proof transactions. In this situation, illustrative embodiments also may request that vehicle 1402D store or refer to the event existence proof block chain.

Such incident event information may be useful in a geographically-limited area. In a conventional centralized management system, all incident event information is collected from whole geographical areas, which may require a large amount of storage space and lead to network congestion. In contrast to conventional centralized management systems, illustrative embodiments share this geographically-dependent information among a plurality of nearby mobile apparatus.

In addition, illustrative embodiments may record a change in state of an incident event in an incident event block chain in real time or near real time. Thus, utilizing illustrative embodiments it may be possible to update incident event information more quickly than using conventional centralized management systems. Mobile apparatus may share the incident event information with secure reliability, without using a trusted third party. Further, because illustrative embodiments generate incident event block chains for each incident event geographic location, incident event information subscribers merely need to pay attention to the incident event information corresponding to its surrounding area.

By using two types of block chains (i.e., the incident event block chain and the event existence proof block chain), illustrative embodiments prevent incident event information verifiers from tampering with proof that the incident event information verifier has been at the geographic location of the incident event. Hence, illustrative embodiments increase reliability of the incident event information in the incident event block chain.

Even if a mobile apparatus reports an erroneous incident event due to a failure of a sensor or the like, illustrative embodiments do not generate an event block including the erroneous incident event or extend a chain of such blocks indicating similar states of incident events because other incident event information verifiers seldom detect the same erroneous incident event information. Consequently, illustrative embodiments automatically delete such erroneously detected incident events from the P2P network.

Also, a scale and range of a geographic area covered by one P2P network can be designed without considering the number of mobile apparatus or the number of incident events. This is because the number of mobile apparatus that participate in the verification process of an unverified incident event may be expected to increase as the number of the mobile apparatus located in a geographic area increases, which may increase the number of incident events occurring within the area as well. Thus, illustrative embodiments may balance the load for verifying incident events among the participants.

Figure 15:
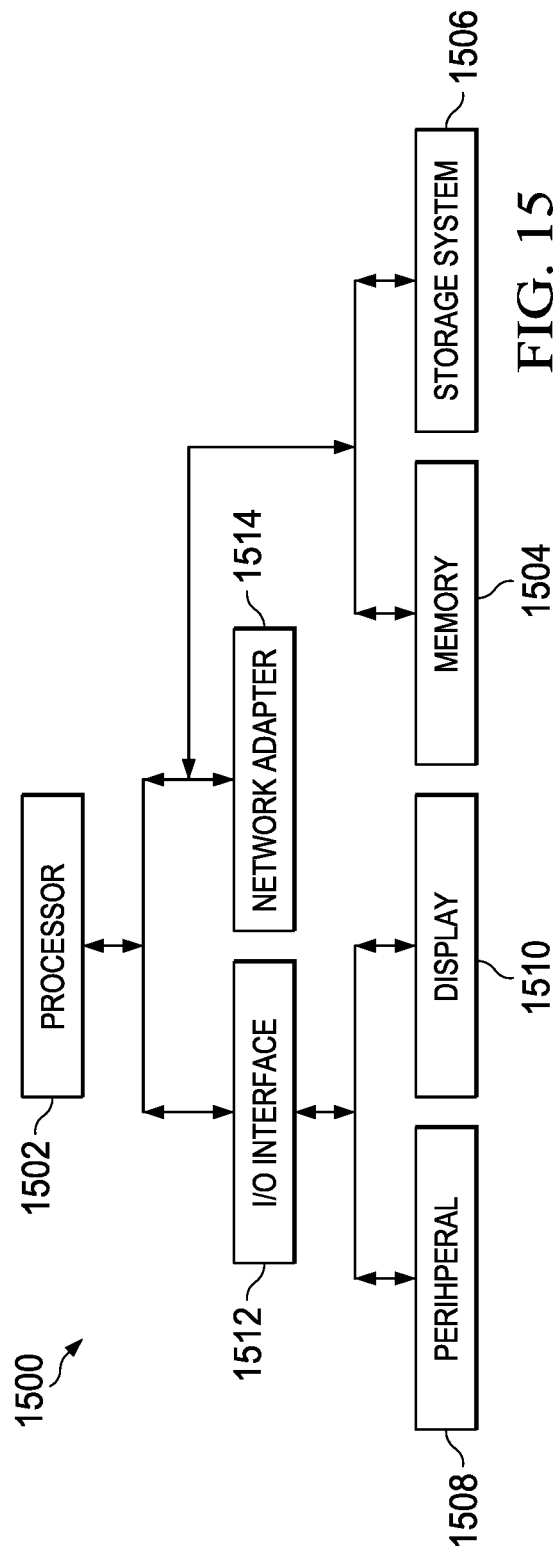
FIG. 15 is a block diagram illustrating an example of a computing node or an on-board data processing device of a mobile apparatus in accordance with one or more illustrative embodiments.

With reference now to FIG. 15, a block diagram illustrating an example of a computing node or an on-board data processing device of a mobile apparatus is depicted in accordance with one or more illustrative embodiments. Computer system 1500 is only one example of a data processing device and is not intended to suggest any limitation as to the scope of use or functionality of illustrative embodiments. Computer system 1500 is operational with numerous other general purpose or special purpose computing system environments or configurations. Examples of well-known computing systems, environments, and/or configurations that may be suitable for use with computer system 1500 may include, but are not limited to, personal computer systems, server computer systems, thin clients, thick clients, hand-held or laptop devices, onboard vehicle devices, multiprocessor systems, microprocessor-based systems, set-top boxes, programmable consumer electronics, network computers, minicomputer systems, mainframe computer systems, and distributed cloud computing environments that include any of the above systems or devices, and the like.

Computer system 1500 may be described in the general context of computer system-executable instructions, such as program modules, being executed by a computer system. Generally, program modules may include routines, programs, objects, components, logic, data structures, and so on that perform particular tasks or implement particular abstract data types.

Computer system 1500 is shown in the form of a general-purpose computing device. The components of computer system 1500 may include, but are not limited to, processor 1502 and memory 1504 coupled to processor 1502 via a bus including a memory bus or memory controller, and a processor or local bus using any of a variety of bus architectures. Computer system 1500 typically includes a variety of computer system readable media. Such media may be any available media that is accessible by computer system 1500 and may include both volatile and non-volatile media, removable and non-removable media.

Memory 1504 may include computer system readable media in the form of volatile memory, such as random access memory (RAM). Computer system 1500 may further include other removable/non-removable, volatile/non-volatile computer system storage media. By way of example only, storage system 1506 may be provided for reading from and writing to a non-removable, non-volatile magnetic media. Storage system 1506 may include at least one program product having a set (e.g., at least one) of program modules that are configured to carry out the functions of illustrative embodiments.

Program/utility, having a set of one or more program modules, may be stored in the storage system 1506 by way of example, and not limitation, as well as an operating system, one or more application programs, other program modules, and program data. Each of the operating system, one or more application programs, other program modules, and program data or some combination thereof, may include an implementation of a networking environment.

Computer system 1500 also may communicate with one or more peripherals 1508 such as a keyboard, a pointing device, a car navigation system, an audio system, and the like; display 1510; one or more devices that enable a user to interact with computer system 1500; and/or any devices (e.g., network card, modem, etc.) that enable computer system 1500 to communicate with one or more other computing devices. Such communication may occur via Input/Output (I/O) interface 1512. Further, computer system 1500 may communicate with one or more networks, such as a local area network (LAN), a general wide area network (WAN), and/or a public network (e.g., the Internet), via network adapter 1514. Network adapter 1514 communicates with the other components of computer system 1500 via the bus. It should be noted that although not shown, other hardware and/or software components may be used in conjunction with computer system 1500. Examples, include, but are not limited to: microcode, device drivers, redundant processing units, external disk drive arrays, RAID systems, tape drives, and data archival storage systems, and the like.

Thus, illustrative embodiments of the present invention provide a computer-implemented method, computer system, and computer program product for sharing of event information among a plurality of mobile apparatus in a P2P network surrounding a geographic location of an incident event. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile apparatus for verifying shared event information, the mobile apparatus comprising:
a memory, wherein the memory stores program instructions; and
a processor in communications with the memory, wherein the processor executes the program instructions to:
communicate with a nearby mobile or immobile apparatus to generate an event existence proof in response to encountering the nearby mobile or immobile apparatus;
verify existence of an incident event in response to arriving at a geographic location of the incident event; and
publish a verified incident event to add to an incident event distributed ledger for managing incident event information corresponding to the incident event.

2. The mobile apparatus of claim 1, wherein the processor further executes the program instructions to:
obtain an unverified incident event reported by other mobile apparatus as the incident event, the unverified incident event including information associated with the geographic location of the unverified incident event.

3. A computer program product for verifying shared event information, the computer program product comprising a computer readable storage medium having program instructions embodied therewith, the program instructions executable by a mobile apparatus to cause the mobile apparatus to perform a method comprising:
communicating, by the mobile apparatus, with a nearby mobile or immobile apparatus to generate an event existence proof in response to encountering the nearby mobile or immobile apparatus;
verifying, by the mobile apparatus, existence of an incident event in response to arriving at a geographic location of the incident event; and
publishing, by the mobile apparatus, a verified incident event to add to an incident event distributed ledger for managing incident event information corresponding to the incident event.

4. The computer program product of claim 3 further comprising:
obtaining, by the mobile apparatus, an unverified incident event reported by other mobile apparatus as the incident event, the unverified incident event including information associated with the geographic location of the unverified incident event.

5. The computer program product of claim 4, wherein the event existence proof is added into an event existence proof block of an existence proof distributed ledger after being verified in terms of geographic location consistency with other event existence proofs.

6. The computer program product of claim 4, wherein the verified incident event is added into the incident event distributed ledger after being validated in terms of geographic locations of the mobile apparatus at a time around the verifying of the existence of the incident event.

7. The computer program product of claim 4, further comprising:
initiating, by the mobile apparatus, communication for generating the event existence proof in response to the mobile apparatus obtaining the unverified incident event, the verified incident event including a list of event existence proofs generated during a time period from the obtaining of the unverified incident event to the publishing of the verified incident event.

8. The computer program product of claim 4, wherein the unverified incident event includes event content of the unverified incident event, and wherein the verifying of the existence of the incident event further comprises:
detecting, by the mobile apparatus, a local incident event around the geographic location of the unverified incident event; and
determining, by the mobile apparatus, whether event content of the local incident event matches the event content of the unverified incident event.

9. The computer program product of claim 8, wherein the publishing of the verified incident event is performed in response to determining that the event content of the local incident event matches the event content of the unverified incident event, and further comprising:
reporting, by the mobile apparatus, a state change relating to the incident event as a new unverified incident event via a network in response to determining that the event content of the local incident event does not match the event content reported by the other mobile apparatus or the local incident event failed to be detected around the geographic location.

10. The computer program product of claim 4, wherein the obtaining of the unverified incident report comprises:
subscribing, by the mobile apparatus, a validated incident event relating to a nearby geographic location; and
retrieving, by the mobile apparatus, an unverified event similar to the validated incident event as the unverified incident event.

* * * * *